US012663973B2

(12) United States Patent
Ren et al.

(10) Patent No.: US 12,663,973 B2
(45) Date of Patent: Jun. 23, 2026

(54) PATCH PACKAGE INSTALLATION METHOD AND APPARATUS

(71) Applicant: Huawei Technologies Co., Ltd.,
Shenzhen (CN)

(72) Inventors: Wenjie Ren, Beijing (CN); Yonghong Yin, Beijing (CN); Yingwei Li, Shenzhen (CN); Hongxi Li, Beijing (CN)

(73) Assignee: Huawei Technologies Co., Ltd.,
Shenzhen (CN)

( * ) Notice: Subject to any disclaimer, the term of this patent is extended or adjusted under 35 U.S.C. 154(b) by 258 days.

(21) Appl. No.: 18/246,141

(22) PCT Filed: Sep. 16, 2021

(86) PCT No.: PCT/CN2021/118852
§ 371 (c)(1),
(2) Date: Mar. 21, 2023

(87) PCT Pub. No.: WO2022/063037
PCT Pub. Date: Mar. 31, 2022

(65) Prior Publication Data
US 2023/0367572 A1 Nov. 16, 2023

(30) Foreign Application Priority Data

Sep. 22, 2020 (CN) .......................... 202011005777.9

(51) Int. Cl.
*G06F 9/445* (2018.01)
*G06F 8/61* (2018.01)
(52) U.S. Cl.
CPC ..................................... *G06F 8/61* (2013.01)

(58) Field of Classification Search
CPC ..... G06F 8/61; G06F 8/65; G06F 8/71; G06F 3/123; G06F 9/5055; G06F 16/9566; G06F 16/23; G06F 2209/541
See application file for complete search history.

(56) References Cited

U.S. PATENT DOCUMENTS

2006/0026304 A1 2/2006 Price
2019/0220268 A1 7/2019 Suzuki
(Continued)

FOREIGN PATENT DOCUMENTS

CN 106708544 A 5/2017
CN 107682440 A 2/2018
(Continued)

*Primary Examiner* — Chuck O Kendall
(74) *Attorney, Agent, or Firm* — Slater Matsil, LLP

(57) ABSTRACT

Embodiments of this application provide a patch package installation method and an apparatus, and relate to the field of terminals. Embodiments of this application are applied to a system including a first electronic device, a second electronic device, and a third electronic device. The method includes: The first electronic device displays prompt information in a first interface, where the prompt information is used to prompt that patch packages for the second electronic device and the third electronic device are detected; the first electronic device receives a first operation of a user, where the first operation is used to install the patch packages for the second electronic device and the third electronic device; the second electronic device installs a patch package corresponding to the second electronic device; and the third electronic device installs a patch package corresponding to the third electronic device.

20 Claims, 31 Drawing Sheets

(56) References Cited

U.S. PATENT DOCUMENTS

| | | | | |
|---|---|---|---|---|
| 2019/0312800 A1* | 10/2019 | Schibler | .............. | H04L 63/1433 |
| 2020/0356354 A1* | 11/2020 | Mitra | ................... | G06F 16/903 |
| 2020/0379744 A1* | 12/2020 | Bhupati | .............. | H04L 41/0893 |

FOREIGN PATENT DOCUMENTS

| | | | |
|---|---|---|---|
| CN | 108259231 | A | 7/2018 |
| CN | 111324363 | A | 6/2020 |
| CN | 111417112 | A | 7/2020 |

* cited by examiner

Cloud side

201

Terminal side

102

107

103

101

109  104  108  105  106

A plurality of electronic devices managed by a first device
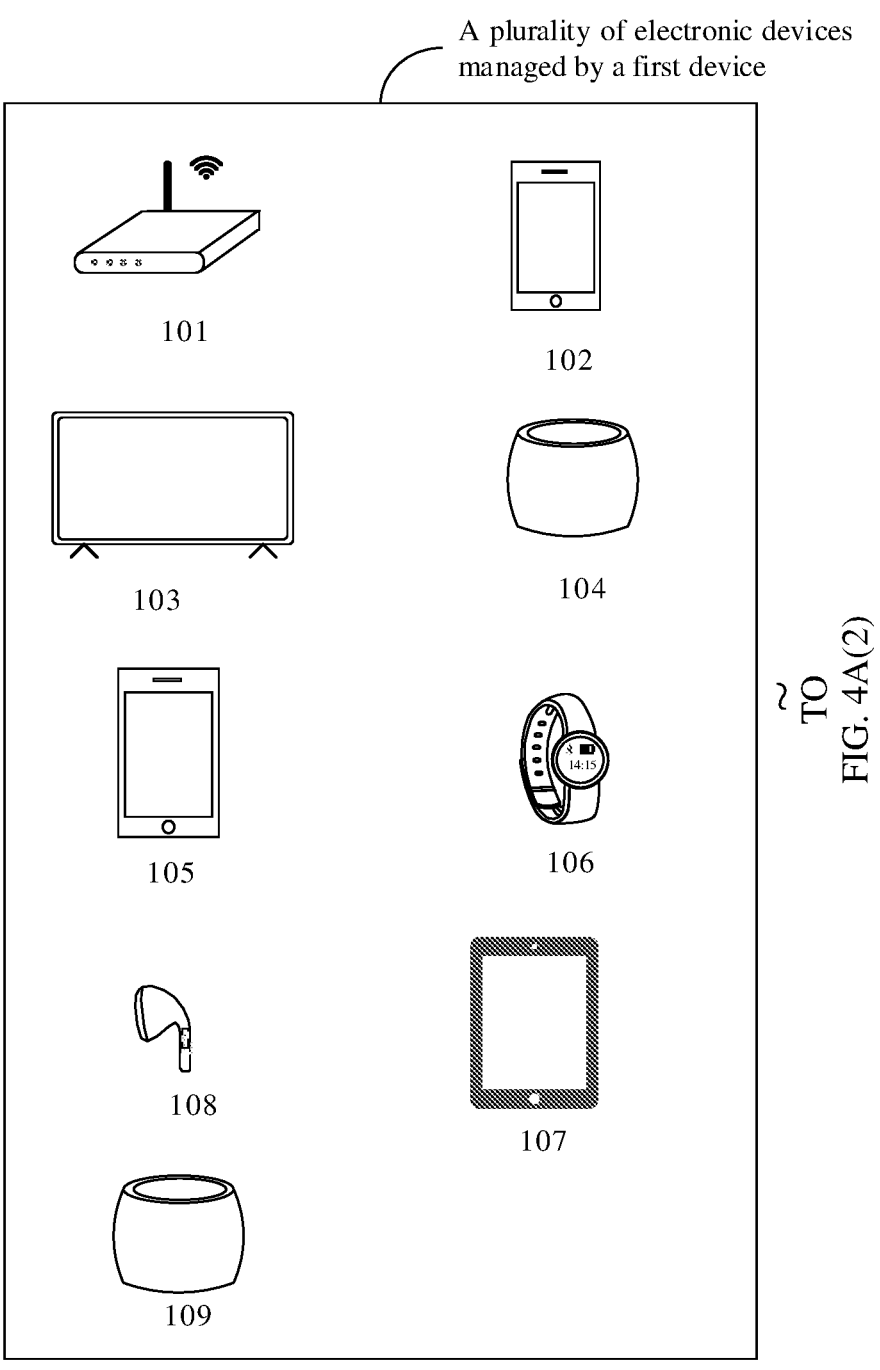
101
102
103
104
105
106
108
107
109
TO
FIG. 4A(2)
FIG. 4A(1)

CONT.
FROM
FIG. 4A(1)
Package search
device
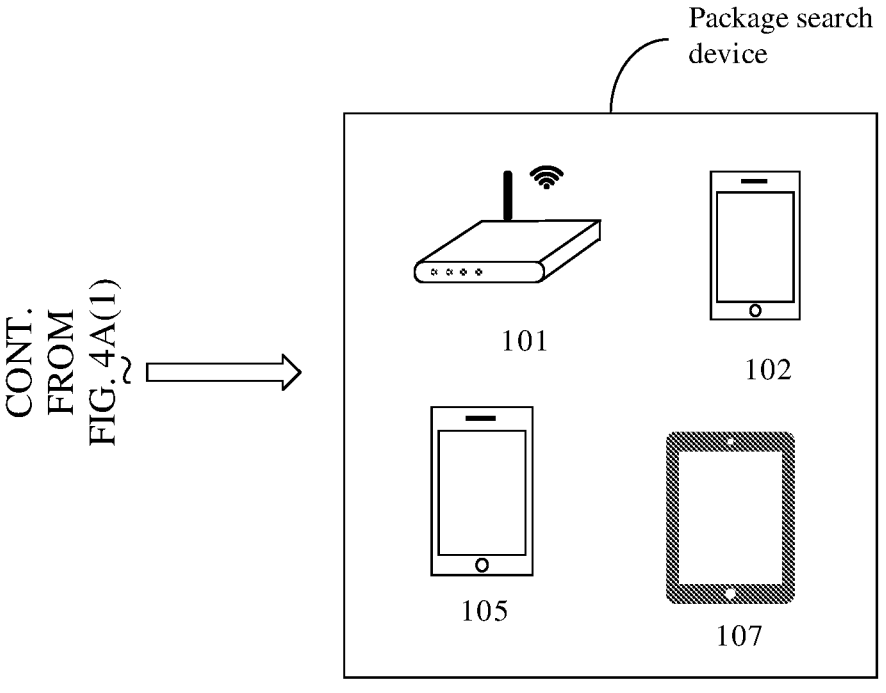
101
102
105
107
FIG. 4A(2)

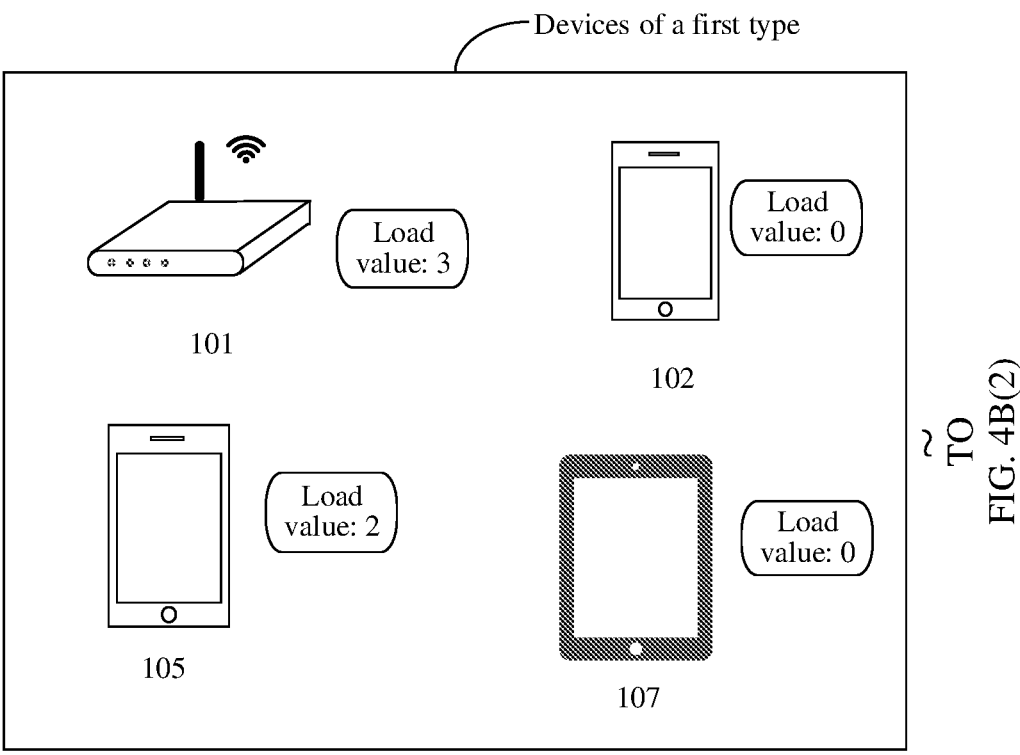
Devices of a first type
101
102
105
107
TO
FIG. 4B(2)
FIG. 4B(1)

CONT. FROM FIG. 4B(1) ~ ⇨
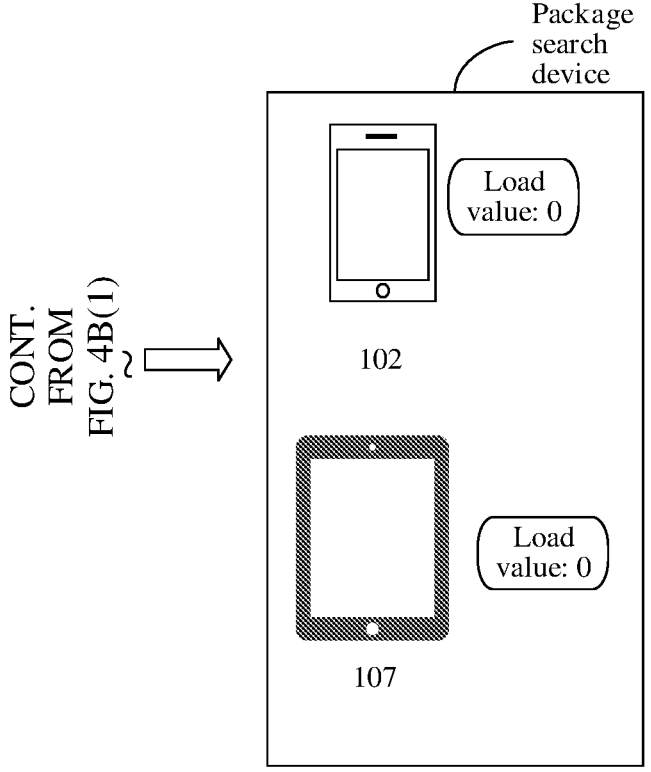
FIG. 4B(2)

PATCH PACKAGE INSTALLATION METHOD AND APPARATUS

CROSS-REFERENCE TO RELATED APPLICATIONS

This application is a National Stage of International Application No. PCT/CN2021/118852 filed on Sep. 16, 2021, which claims priority to Chinese Patent Application No. 202011005777.9, filed on Sep. 22, 2020, both of which are hereby incorporated by reference in their entireties.

TECHNICAL FIELD

This application relates to the field of terminals, and in particular, to a patch package installation method and an apparatus.

BACKGROUND

Currently, in a development process of software, it is inevitable that some software design vulnerabilities or new user requirements for the software exist. To avoid affecting use of the software, a patch (patch package) may be released on a server to fix or update the vulnerabilities. A device can periodically search for a patch package from the server. Specifically, the device may initiate a search to the server based on a version number of the device. After identifying the information, the server searches for a patch package. After the search succeeds, the patch package is downloaded to a single electronic device (that is, the server sends the found patch package to the single electronic device). The electronic device verifies the patch package. After the patch package is successfully verified, the patch package is installed.

With development of electronic devices, a user has more electronic devices. If all electronic devices require the user to perform confirmation one by one to search for and download a patch package, a great trouble is caused to the user, and fixing of an emergency problem is also affected.

SUMMARY

Embodiments of this application provide a patch package installation method and an apparatus, to simultaneously install patch packages for a plurality of electronic devices.

According to a first aspect, an embodiment of this application provides a patch package installation method, applied to a system that includes a first electronic device, a second electronic device, and a third electronic device, and including: The first electronic device displays prompt information in a first interface, where the prompt information is used to prompt that patch packages for the second electronic device and the third electronic device are detected; the first electronic device receives a first operation of a user, where the first operation is used to install the patch packages for the second electronic device and the third electronic device; the second electronic device installs a patch package corresponding to the second electronic device; and the third electronic device installs a patch package corresponding to the third electronic device.

Based on the method provided in this embodiment of this application, installation of the patch packages for the second electronic device and the third electronic device may be controlled and managed on the first electronic device. In response to the first operation of the user, the first electronic device may enable the second electronic device to install the patch package corresponding to the second electronic device, and enable the third electronic device to install the patch package corresponding to the third electronic device, that is, patch packages for a plurality of electronic devices can be installed at the same time. In this way, the user does not need to separately download and install the patch packages, so that a user operation can be simplified, and user experience can be improved.

In a possible implementation, the method further includes: The first electronic device determines a fourth electronic device based on a device type and/or a load value, where the fourth electronic device is configured to search for the patch packages for the second electronic device and the third electronic device; and the fourth electronic device is of a first type and/or a load value of the fourth electronic device is less than a first preset threshold. In this way, if a load value of the first electronic device is large, an electronic device (for example, the fourth electronic device) with a small load value may be enabled to search for a patch package, so that resources (processing resources and the like) of another electronic device can be fully utilized, thereby avoiding excessively high resource consumption of the first electronic device.

In a possible implementation, the method further includes: The first electronic device searches for the patch packages for the second electronic device and the third electronic device. If the load value of the first electronic device is small, for example, less than the first preset threshold, the first electronic device may search for the patch packages without triggering another electronic device to search for the patch packages.

In a possible implementation, types of patch packages include at least one of an application package type, a resource file type, a software framework type, a native framework type, and a kernel type. Alternatively, the types of patch packages may include another type, for example, a patch type obtained after patch types such as an application package type, a software framework type, or a kernel type are normalized. This is not limited in this application.

In a possible implementation, the system further includes a server, and the method further includes: The fourth electronic device or the first electronic device sends a first message to the server, where the first message includes an identifier of the second electronic device and an identifier of the third electronic device; or the first message includes a first identifier, the first identifier is used to indicate a plurality of electronic devices, and the plurality of electronic devices include the second electronic device and the third electronic device. After receiving the first identifier, the server may determine, based on the first identifier, whether the plurality of electronic devices have patch packages. Because the first identifier can indicate the plurality of electronic devices, respective identities of the plurality of electronic devices are not carried, and signaling consumption can be reduced.

In a possible implementation, the first identifier is generated based on product serial numbers of the plurality of electronic devices. In this embodiment of this application, the server may obtain the first identifier by performing a reversible operation based on the product serial numbers of the plurality of electronic devices. In other words, the server may deduce the product serial numbers of the plurality of electronic devices based on the first identifier.

In a possible implementation, the first identifier is determined based on a same user account to which both the second electronic device and the third electronic device log in. For example, a Huawei account to which a plurality of electronic devices have logged in may be used as the first identifier.

In a possible implementation, the first message further includes software version information of the second electronic device and software version information of the third electronic device. In this way, the server may determine, based on current software version information of an electronic device, whether there is a corresponding patch package (a latest released patch package).

In a possible implementation, the first message further includes device model information of the second electronic device and device model information of the third electronic device. In this way, the server may determine, based on current software version information and device model information of an electronic device, whether there is a corresponding patch package (a latest released patch package).

In a possible implementation, the first message further includes a type of a patch package to be searched for. In this way, the first electronic device or the fourth electronic device may search for a specific-type patch package, and when delivering a patch package, the server may deliver the specific-type patch package to the first electronic device or the fourth electronic device. In this way, resources (processing resources, storage resources, or the like) of different electronic devices can be fully utilized, thereby avoiding excessively high resource consumption of one electronic device.

In a possible implementation, the type of the patch package to be searched for is determined based on an operating system and/or a device resource of the electronic device that sends the first message, where the device resource includes at least one of a capacity of a memory or a processing speed of a processor. In this way, resources (processing resources, storage resources, or the like) of different electronic devices can be fully utilized, thereby avoiding excessively high resource consumption of one electronic device.

In a possible implementation, the method further includes: The server determines the plurality of electronic devices corresponding to the first identifier; and the server searches for a patch package for each of the plurality of electronic devices. Optionally, the server may further determine, based on software version information of each electronic device, whether the electronic device has a patch package.

In a possible implementation, the method further includes: The server sends a patch package search result to the fourth electronic device or the first electronic device, where the patch package search result is used to indicate whether some or all of the plurality of electronic devices have a patch package. Further, the fourth electronic device or the first electronic device may prompt the user of the patch package search result.

In a possible implementation, if some or all of the plurality of electronic devices have a patch package, the method further includes: The server sends at least one of version number information of the patch package, uniform resource locator address information, patch size information, or changelog information to the fourth electronic device or the first electronic device.

In a possible implementation, the server sends the patch packages for the second electronic device and the third electronic device to the fourth electronic device or the first electronic device. In this way, the second electronic device and the third electronic device may respectively obtain, from the fourth electronic device or the first electronic device, the patch package corresponding to the second electronic device and the patch package corresponding to the third electronic device, and may respectively install the patch package corresponding to the second electronic device and the patch package corresponding to the third electronic device.

In a possible implementation, when types of the patch packages for the second electronic device and the third electronic device are the same, the patch packages for the second electronic device and the third electronic device include a first patch package and a second patch package, the first patch package includes all patch programs used to fix software of the second electronic device, and the second patch package includes a patch program that is in all patch programs used to fix software of the third electronic device and that is different from the patch programs of the first patch package. Because most data in patch packages used to fix a same problem of electronic devices of different software versions and/or device models are the same, and only a small part of data are different, a differential storage manner may be used to ensure that the patch packages used to fix a same problem occupy fewer resources.

In a possible implementation, the server stores a plurality of first identities, and the method further includes: If electronic devices corresponding to all or some of the plurality of first identities have patch packages, the server pushes information about the patch packages to the electronic devices corresponding to all or some of the plurality of first identities. In this way, the plurality of electronic devices corresponding to the first identifier do not need to separately download the patch packages, so that communication resources can be saved. In addition, the user does not need to separately download the patch packages, so that a user operation can be simplified, and user experience can be improved.

In a possible implementation, the method further includes: The fourth electronic device or the first electronic device performs authentication verification on the patch packages for the second electronic device and the third electronic device, where the authentication verification includes at least one of foolproof verification, security verification, and file verification. In this way, the second electronic device or the third electronic device may directly install the patch package without verifying the patch package, so that installation time can be reduced.

In a possible implementation, the method further includes: The fourth electronic device or the first electronic device sends the patch packages for the second electronic device and the third electronic device to a fifth electronic device, where the fifth electronic device stores the patch packages for the second electronic device and the third electronic device. The fifth electronic device may be an electronic device with large storage space and/or the fifth electronic device may be an electronic device that is always online. This avoids increasing a storage burden of the first electronic device or the fourth electronic device. In addition, if the first electronic device or the fifth electronic device is offline, another electronic device (for example, the second electronic device or the third electronic device) may obtain a patch package from the fifth electronic device, and installation of the patch package is not affected.

In a possible implementation, the first electronic device stores the patch packages for the second electronic device and the third electronic device. If storage space of the first electronic device is large, the patch packages for the second electronic device and the third electronic device may be stored in the first electronic device, and the patch packages do not need to be sent to the fifth electronic device, thereby reducing signaling consumption.

In a possible implementation, the method further includes: The fifth electronic device or the first electronic device broadcasts patch package set information, where the patch set information includes cache addresses of the patch packages for the second electronic device and the third electronic device. In this way, the second electronic device and the third electronic device may obtain the patch packages for the second electronic device and the third electronic device based on the broadcast cache addresses.

In a possible implementation, the method further includes: The second electronic device obtains the patch package for the second electronic device from the fifth electronic device or the first electronic device, and the third electronic device obtains the patch package for the third electronic device from the fifth electronic device or the first electronic device. Then, the second electronic device and the third electronic device may respectively install the patch package for the second electronic device and the patch package for the third electronic device.

In a possible implementation, the method further includes: The first electronic device assists the second electronic device in patch package installation. This is because some electronic devices do not have a capability of independently installing a patch package, and need assistance of another electronic device in patch package installation. An electronic device (the second electronic device) that does not have a capability of independently installing a patch package may be, for example, a smartwatch, a headset, or a sound box. An electronic device (the first electronic device) that may assist in patch package installation may be, for example, a mobile phone or a tablet computer.

In a possible implementation, that the first electronic device assists the second electronic device in patch package installation includes: The first electronic device places the patch package for the second electronic device under a first directory, and the second electronic device mounts the first directory. In this case, a patch takes effect (equivalent to writing the patch package into the second electronic device). This can resolve a problem that the second electronic device cannot install a patch.

In a possible implementation, that the first electronic device assists the second electronic device in patch package installation includes: The second electronic device provides a second directory, and the first electronic device obtains permission for the second directory through identifier identification, and places the patch package for the second electronic device under the second directory. This can resolve the problem that the second electronic device cannot install a patch.

In a possible implementation, that the first electronic device assists the second electronic device in patch package installation includes: The first electronic device mounts the patch package for the second electronic device to the second electronic device as a driving peripheral. This can resolve the problem that the second electronic device cannot install a patch.

According to a second aspect, an embodiment of this application provides a patch package installation method, including: A first electronic device displays prompt information in a first interface, where the prompt information is used to prompt that patch packages for a second electronic device and a third electronic device are detected; the first electronic device receives a first operation of a user, where the first operation is used to install the patch packages for the second electronic device and the third electronic device; the first electronic device sends, to the second electronic device, a patch package corresponding to the second electronic device; and the first electronic device sends, to the third electronic device, a patch package corresponding to the third electronic device.

In a possible implementation, the method further includes: The first electronic device searches for the patch packages for the second electronic device and the third electronic device, where a load value of the first electronic device is less than a first preset threshold.

In a possible implementation, the method further includes: The first electronic device sends a first message to a server, where the first message includes an identifier of the second electronic device and an identifier of the third electronic device; or the first message includes a first identifier, the first identifier is used to indicate a plurality of electronic devices, and the plurality of electronic devices include the second electronic device and the third electronic device.

In a possible implementation, the first identifier is generated based on product serial numbers of the plurality of electronic devices.

In a possible implementation, the first identifier is determined based on a same user account to which both the second electronic device and the third electronic device log in.

In a possible implementation, the first message further includes software version information of the second electronic device and software version information of the third electronic device.

In a possible implementation, the first message further includes device model information of the second electronic device and device model information of the third electronic device.

In a possible implementation, the first message further includes a type of a patch package to be searched for.

In a possible implementation, the type of the patch package to be searched for includes at least one of an application package type, a resource file type, a software framework type, a native framework type, and a kernel type.

In a possible implementation, the method further includes: The first electronic device performs authentication verification on the patch packages for the second electronic device and the third electronic device, where the authentication verification includes at least one of foolproof verification, security verification, and file verification.

In a possible implementation, the method further includes: The first electronic device stores the patch packages for the second electronic device and the third electronic device; and the first electronic device broadcasts patch package set information, where the patch set information includes cache addresses of the patch packages for the second electronic device and the third electronic device.

In a possible implementation, the method further includes: The first electronic device assists the second electronic device in patch package installation.

In a possible implementation, that the first electronic device assists the second electronic device in patch package installation includes: The first electronic device places the patch package for the second electronic device under a first directory, and the second electronic device mounts the first directory.

In a possible implementation, that the first electronic device assists the second electronic device in patch package installation includes: The first electronic device obtains, through identifier identification, permission for a second directory provided by the second electronic device, and places the patch package for the second electronic device under the second directory.

In a possible implementation, that the first electronic device assists the second electronic device in patch package installation includes: The first electronic device mounts the patch package for the second electronic device to the second electronic device as a driving peripheral.

According to a third aspect, an embodiment of this application provides a first electronic device. The first electronic device includes a wireless communication module, a memory, and one or more processors. The wireless communication module and the memory are coupled to the processor. The memory is configured to store computer program code, and the computer program code includes computer instructions. When the computer instructions are executed by the processor, the first electronic device is enabled to perform the method according to any one of the first aspect or the second aspect and the possible implementations of the first aspect or the second aspect.

According to a fourth aspect, an embodiment of this application provides a first electronic device. The apparatus has a function of implementing the method according to any one of the first aspect or the second aspect and the possible implementations of the first aspect or the second aspect. The function may be implemented by hardware, or may be implemented by hardware executing corresponding software. The hardware or the software includes one or more modules corresponding to the foregoing function.

According to a fifth aspect, an embodiment of this application provides a chip system. The chip system includes one or more interface circuits and one or more processors. The interface circuit and the processor are interconnected by using a line. The foregoing chip system may be applied to a first electronic device including a communication module and a memory. The interface circuit is configured to receive a signal from the memory, and send the received signal to the processor, and the signal includes computer instructions stored in the memory. When the processor executes the computer instructions, the first electronic device may perform the method according to any one of the first aspect or the second aspect and the possible implementations of the first aspect or the second aspect.

Alternatively, the foregoing chip system may be applied to a second electronic device including a communication module and a memory. The interface circuit is configured to receive a signal from the memory, and send the received signal to the processor, and the signal includes computer instructions stored in the memory. When the processor executes the computer instructions, the second electronic device may perform a method similar to the method related to the second electronic device in any one of the first aspect and the possible implementations of the first aspect.

Alternatively, the foregoing chip system may be applied to a third electronic device including a communication module and a memory. The interface circuit is configured to receive a signal from the memory, and send the received signal to the processor, and the signal includes computer instructions stored in the memory. When the processor executes the computer instructions, the third electronic device may perform a method similar to the method related to the third electronic device in any one of the first aspect and the possible implementations of the first aspect.

Alternatively, the foregoing chip system may be applied to a server including a communication module and a memory. The interface circuit is configured to receive a signal from the memory, and send the received signal to the processor, and the signal includes computer instructions stored in the memory. When the processor executes the computer instructions, the server may perform a method similar to the method related to the server in any one of the first aspect and the possible implementations of the first aspect.

Alternatively, the foregoing chip system may be applied to a fourth electronic device including a communication module and a memory. The interface circuit is configured to receive a signal from the memory, and send the received signal to the processor, and the signal includes computer instructions stored in the memory. When the processor executes the computer instructions, the fourth electronic device may perform a method similar to the method related to the fourth electronic device in any one of the first aspect and the possible implementations of the first aspect.

Alternatively, the foregoing chip system may be applied to a fifth electronic device including a communication module and a memory. The interface circuit is configured to receive a signal from the memory, and send the received signal to the processor, and the signal includes computer instructions stored in the memory. When the processor executes the computer instructions, the fifth electronic device may perform a method similar to the method related to the fifth electronic device in any one of the first aspect and the possible implementations of the first aspect.

According to a sixth aspect, an embodiment of this application provides a computer-readable storage medium. The computer-readable storage medium includes computer instructions. When the computer instructions are run on a first electronic device, the first electronic device is enabled to perform a method similar to the method related to the first electronic device in any one of the first aspect or the second aspect and the possible implementations of the first aspect or the second aspect. When the computer instructions are run on a second electronic device, the second electronic device is enabled to perform a method similar to the method related to the second electronic device in any one of the first aspect and the possible implementations of the first aspect. When the computer instructions are run on a third electronic device, the third electronic device is enabled to perform a method similar to the method related to the third electronic device in any one of the first aspect and the possible implementations of the first aspect. When the computer instructions are run on a server, the server is enabled to perform a method similar to the method related to the server in any one of the first aspect and the possible implementations of the first aspect. When the computer instructions are run on a fourth electronic device, the fourth electronic device is enabled to perform a method similar to the method related to the fourth electronic device in any one of the first aspect and the possible implementations of the first aspect. When the computer instructions are run on a fifth electronic device, the fifth electronic device is enabled to perform a method similar to the method related to the fifth electronic device in any one of the first aspect and the possible implementations of the first aspect.

According to a seventh aspect, an embodiment of this application provides a computer program product. When the computer program product runs on a computer, the computer is enabled to perform the method according to any one of the first aspect or the second aspect and the possible implementations of the first aspect or the second aspect.

According to an eighth aspect, an embodiment of this application provides a patch package installation system, including a first electronic device, a second electronic device, and a third electronic device. The first electronic device may perform the method according to any one of the first aspect or the second aspect and the possible implementations of the first aspect or the second aspect, the second electronic device may perform a method similar to the method related to the second electronic device in any one of the first aspect and the possible implementations of the first aspect, and the third electronic device may perform a method similar to the method related to the third electronic device in any one of the first aspect and the possible implementations of the first aspect.

Optionally, the patch package installation system may further include a server, and the server may perform a method similar to the method related to the server in any one of the first aspect and the possible implementations of the first aspect. Optionally, the patch package installation system may further include a fourth electronic device, and the fourth electronic device may perform a method similar to the method related to the fourth electronic device in any one of the first aspect and the possible implementations of the first aspect. Optionally, the patch package installation system may further include a fifth electronic device, and the fifth electronic device may perform a method similar to the method related to the fifth electronic device in any one of the first aspect and the possible implementations of the first aspect.

BRIEF DESCRIPTION OF THE DRAWINGS

FIG. 4A(1) and FIG. 4A(2) are a schematic diagram of selecting a package search device according to an embodiment of this application;

FIG. 4B(1) and FIG. 4B(2) are another schematic diagram of selecting a package search device according to an embodiment of this application;

DETAILED DESCRIPTION OF ILLUSTRATIVE EMBODIMENTS

The following describes technical solutions in embodiments of this application with reference to the accompanying drawings in embodiments of this application. In the description of this application, unless otherwise specified, "at least one" means one or more, and "a plurality of" means two or more. In addition, to clearly describe the technical solutions in embodiments of this application, terms such as "first" and "second" are used in embodiments of this application to distinguish between same items or similar items that have basically the same functions or purposes. A person skilled in the art may understand that the terms such as "first" and "second" do not limit a quantity or an execution sequence, and the terms such as "first" and "second" do not indicate a definite difference.

Figure 1A:
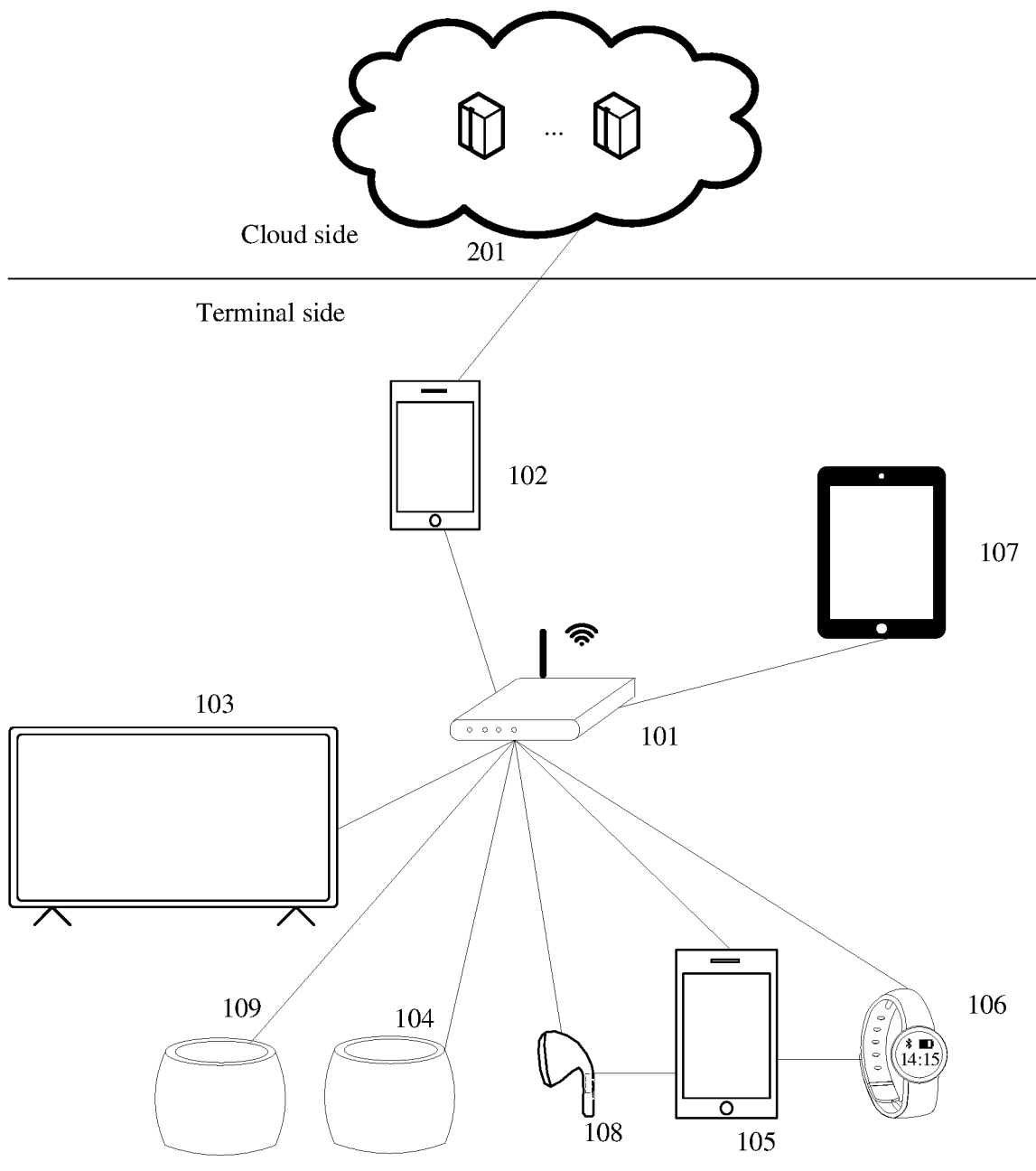
FIG. 1A is a schematic diagram of a system architecture according to an embodiment of this application.

FIG. 1A is a schematic diagram of a system architecture according to an embodiment of this application. The system may include a terminal side (an electronic device side) and a cloud side (a server side). The cloud side may include at least one server. For example, the cloud side may include a server 201. The terminal side may include at least one electronic device. For example, the terminal side may include a router 101, a mobile phone 102, a television (smart TV) 103, a sound box (smart sound box) 104, a mobile phone 105, a watch (smartwatch) 106, a tablet computer 107, a headset (smart headset) 108, and a sound box 109. Electronic devices on the terminal side may form a home network based on a router (that is, communicate with each other by using wireless fidelity (wireless fidelity, Wi-Fi)). The electronic devices on the device side may alternatively communicate with each other in a communication manner, for example, by using Bluetooth or a near field communication (near field communication, NFC) technology.

The at least one electronic device on the terminal side may include two types of electronic devices, for example, may include a first-type electronic device and a second-type electronic device. An operational capability of a processor of the first-type electronic device may be higher than that of the second-type electronic device. Alternatively, a capacity of a memory of the first-type electronic device may be greater than that of the second-type electronic device. Alternatively, a hardware configuration of the first-type electronic device is higher than that of the second-type electronic device. For example, the hardware configuration of the first-type electronic device can run a system, for example, Windows or Android (Android). The hardware configuration of the second-type electronic device may run a lite operating system, where the lite operating system may be, for example, an Android system or a lite Internet of things operating system (lite OS). Alternatively, the second-type electronic device may not run an operating system. Alternatively, the first-type electronic device may manage the second-type electronic device.

For example, the first-type electronic device may be a device such as a mobile phone, a personal computer (personal computer, PC), a tablet computer, a desktop (desktop computer), a handheld computer, a notebook computer (laptop computer), an ultra-mobile personal computer (ultra-mobile personal computer, UMPC), a netbook, a personal digital assistant (personal digital assistant, PDA), a router, or a television. A specific form of the first-type electronic device is not specifically limited in this embodiment of this application.

The second-type electronic device may be a device that can access a home wireless local area network, for example, a speaker, a camera, an air conditioner, a refrigerator, a smart curtain, a desk lamp, a ceiling lamp, an electric rice cooker, a security device (for example, a smart electronic lock), a robot, a sweeper, or a smart scale. Alternatively, the second-type electronic device may be a wearable device, for example, a smart headset, smart glasses, a smartwatch, a smart band, an augmented reality (augmented reality, AR)/ virtual reality (virtual reality, VR) device, a wireless locator, a tracker (Tracker), or an electronic collar. The second-type electronic device in this embodiment of this application may alternatively be a device, for example, a vehicle-mounted speaker, or a vehicle-mounted air conditioner. A specific form of the second-type electronic device is not specifically limited in this embodiment of this application.

Figure 1B:
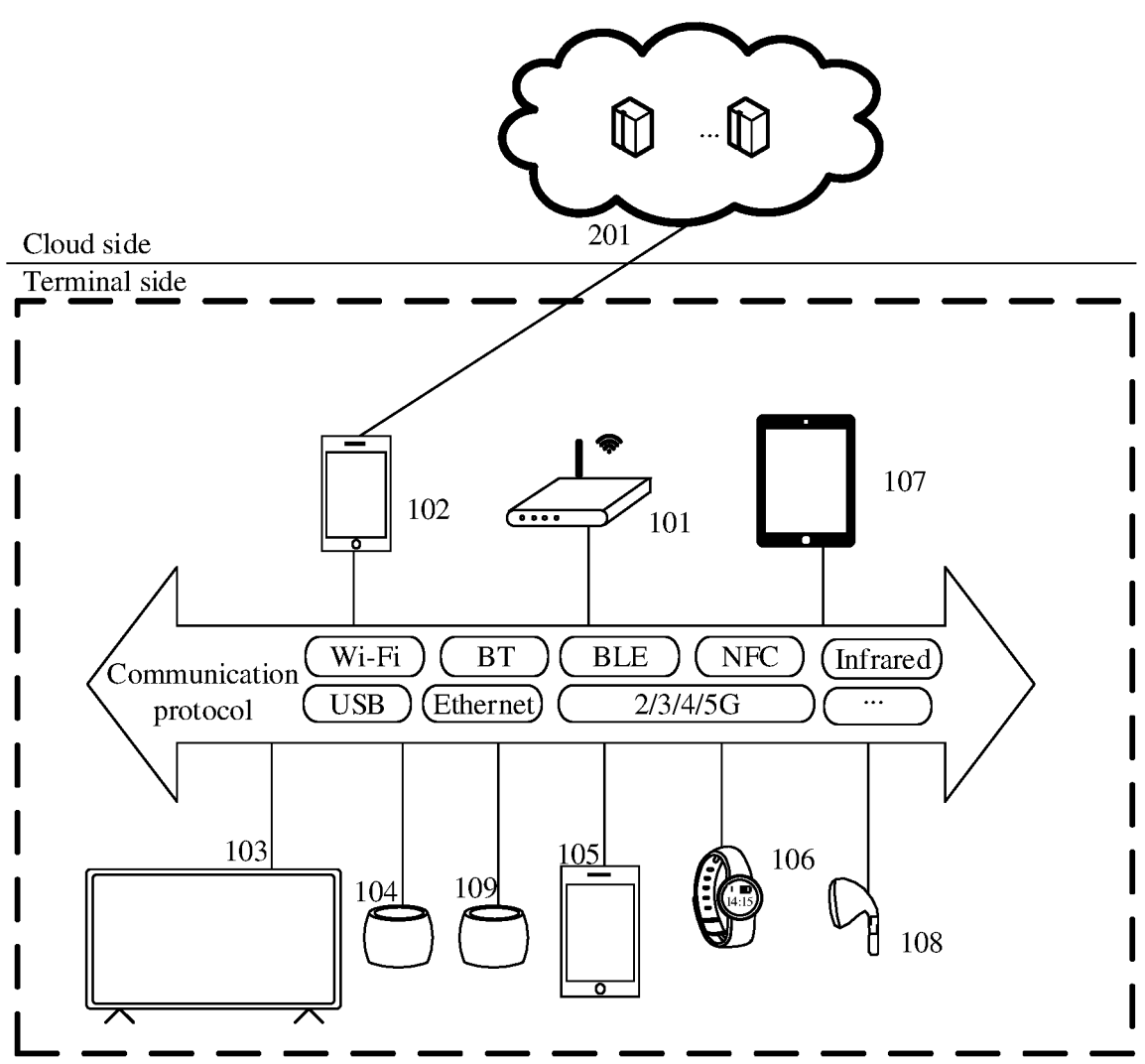
FIG. 1B is a schematic diagram of another system architecture according to an embodiment of this application.

FIG. 1B is a schematic diagram of another system architecture according to an embodiment of this application. In the system, electronic devices on a device side may communicate with each other according to a communication protocol. The communication protocol may include Wi-Fi, Bluetooth (Bluetooth, BT), Bluetooth low energy (Bluetooth low energy, BLE), NFC, infrared (rays), a universal serial bus (universal serial bus, USB), Ethernet, 2/3/4/5G, or the like. A communication module may be integrated into each electronic device on the terminal side, and the communication modules of the electronic devices may exchange information according to a communication protocol. The communication module may be configured to determine a specific message format, a transmission rate, a protocol specification, or the like. For example, an operating system of the electronic device may be an Android system, a Harmony OS, a lite Harmony OS, a lite OS, a Linux system, a dual-framework system, or another operating system. This is not limited in this embodiment of this application. Electronic devices with different types of operating systems may correspond to different communication modules.

The electronic devices on the terminal side may keep a connection to each other based on a "heartbeat mechanism", where the "heartbeat mechanism" means that heartbeat messages are exchanged between every two electronic devices based on a preset period (for example, 30 s). When one of the electronic devices needs to send a message to a peer electronic device, this electronic device may wake up the peer electronic device by using a specific message, to perform normal signaling interaction (for example, sending a data packet).

Figure 2A:
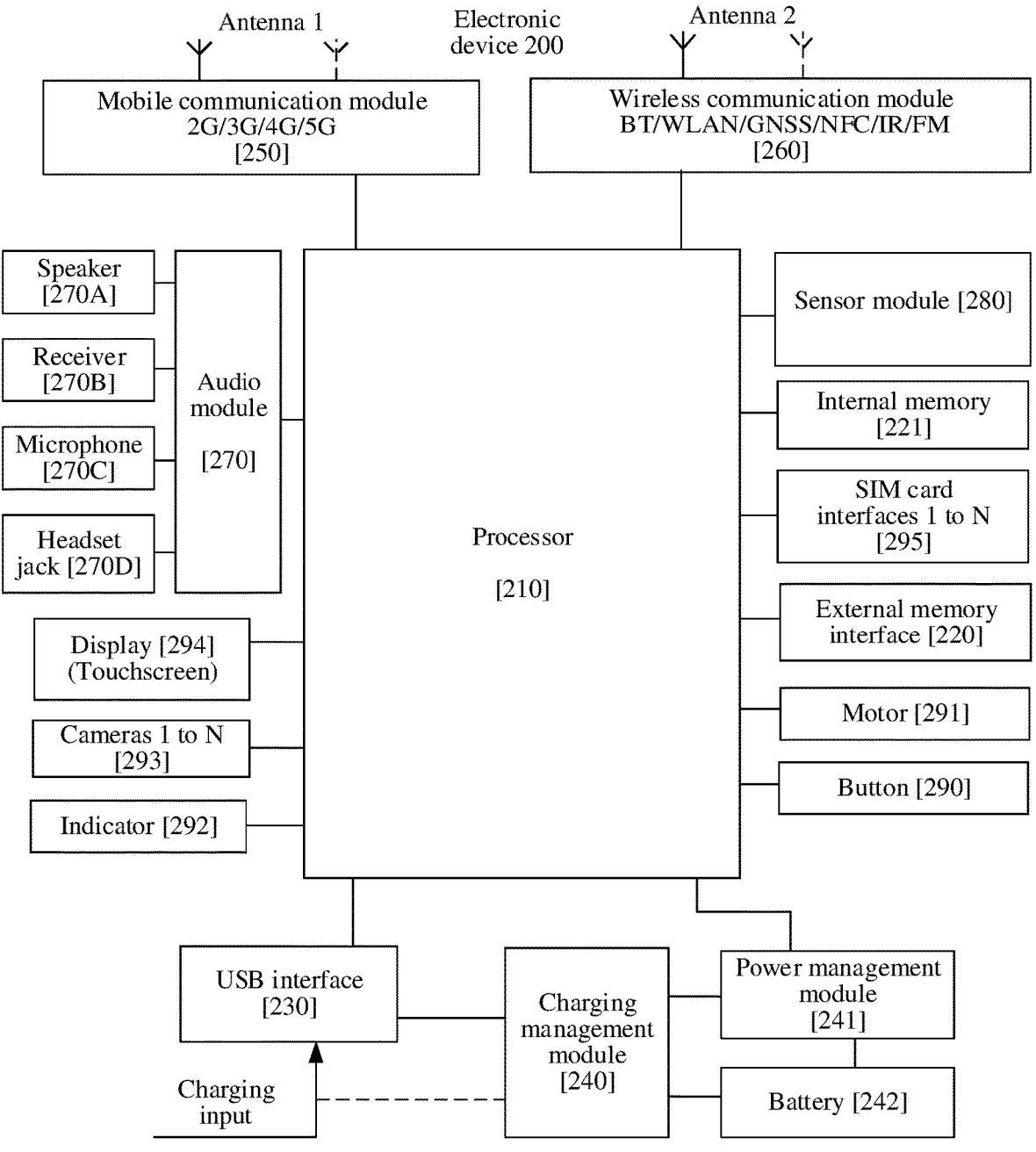
FIG. 2A is a schematic diagram of a hardware architecture of an electronic device according to an embodiment of this application.

In an embodiment of this application, an example in which a first electronic device is an electronic device 200 (for example, a mobile phone) is used to describe a structure of the first electronic device provided in this embodiment of this application. As shown in FIG. 2A, the electronic device 200 (for example, a mobile phone) may include a processor 210, an external memory interface 220, an internal memory 221, a universal serial bus (universal serial bus, USB) interface 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a button 290, a motor 291, an indicator 292, a camera 293, a display 294, a subscriber identifier module (subscriber identification module, SIM) card interface 295, and the like.

The sensor module 280 may include sensors such as a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, and a bone conduction sensor.

It may be understood that the structure shown in this embodiment of this application is not construed as a specific limitation on the electronic device 200. In some other embodiments of this application, the electronic device 200 may include more or fewer components than those shown in the figure, some components may be combined, some components may be split, or different component arrangements may be used. The components shown in the figure may be implemented by using hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and a command center of the electronic device 200. The controller may generate an operation control signal based on an instruction operation code and a time sequence signal, to complete control of instruction fetching and instruction execution.

A memory may be further disposed in the processor 210, and is configured to store instructions and data. In some embodiments, the memory in the processor 210 is a cache. The memory may store instructions or data that has been used or is cyclically used by the processor 210. If the processor 210 needs to use the instructions or the data again, the processor may directly invoke the instructions or the data from the memory. This avoids repeated access, reduces waiting time of the processor 210, and improves system efficiency.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identifier module (subscriber identifier module, SIM) interface, a universal serial bus (universal serial bus, USB) interface, and/or the like.

It may be understood that an interface connection relationship between the modules that is shown in this embodiment is merely an example for description, and is not construed as a limitation on the structure of the electronic device 200. In some other embodiments, the electronic device 200 may alternatively use an interface connection manner different from that in the foregoing embodiment, or use a combination of a plurality of interface connection manners.

The charging management module 240 is configured to receive a charging input from a charger. The charger may be a wireless charger or a wired charger. The charging management module 240 may further supply power to the electronic device by using the power management module 241 while charging the battery 242.

The power management module 241 is configured to connect the battery 242, the charging management module 240, and the processor 210. The power management module 241 receives an input of the battery 242 and/or the charging management module 240, and supplies power to the processor 210, the internal memory 221, an external memory, the display 294, the camera 293, the wireless communication module 260, and the like. In some embodiments, the power management module 241 and the charging management module 240 may alternatively be disposed in a same component.

A wireless communication function of the electronic device 200 may be implemented by using the antenna 1, the antenna 2, the mobile communication module 250, the wireless communication module 260, a modem processor, a baseband processor, and the like. In some embodiments, in the electronic device 200, the antenna 1 and the mobile communication module 250 are coupled, and the antenna 2 and the wireless communication module 260 are coupled, so that the electronic device 200 can communicate with a network and another device by using a wireless communication technology.

The antenna 1 and the antenna 2 are configured to transmit and receive an electromagnetic wave signal. Each antenna in the electronic device 200 may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communication module 250 may provide a solution for wireless communication that is applied to the electronic device 200 and that includes, for example, 2G/3G/4G/5G. The mobile communication module 250 may include at least one filter, a switch, a power amplifier, a low noise amplifier (low noise amplifier, LNA), and the like. The mobile communication module 250 may receive an electromagnetic wave through the antenna 1, perform processing such as filtering or amplification on the received electromagnetic wave, and transmit the electromagnetic wave to the modem processor for demodulation.

The mobile communication module 250 may further amplify a signal modulated by the modem processor, and convert the signal into an electromagnetic wave for radiation through the antenna 1. In some embodiments, at least some function modules of the mobile communication module 250 may be disposed in the processor 210. In some embodiments, at least some function modules of the mobile communication module 250 may be disposed in a same device as at least some modules of the processor 210.

The wireless communication module 260 may provide a solution for wireless communication that is applied to the electronic device 200 and that includes a WLAN (for example, a wireless fidelity (Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like.

The wireless communication module 260 may be one or more components integrating at least one communication processor module. The wireless communication module 260 receives an electromagnetic wave through the antenna 2, performs frequency modulation and filtering processing on an electromagnetic wave signal, and sends a processed signal to the processor 210. The wireless communication module 260 may further receive a to-be-sent signal from the processor 210, perform frequency modulation and amplification on the signal, and convert the signal into an electromagnetic wave for radiation through the antenna 2.

The electronic device 200 may implement a display function through the GPU, the display 294, the application processor, and the like. The GPU is a microprocessor for image processing, and is connected to the display 294 and the application processor. The GPU is configured to perform mathematical and geometric calculation, and render an image. The processor 210 may include one or more GPUs that execute program instructions to generate or change display information.

The display 294 is configured to display an image, a video, or the like. The display 294 includes a display panel. For example, in this embodiment of this application, the display 294 may be configured to display an application interface of a first APP, for example, a patch package information prompt interface or a patch package installation interface.

The electronic device 200 can implement a photographing function by using the ISP, the camera 293, the video codec, the GPU, the display 294, the application processor, and the like. The ISP is configured to process data fed back by the camera 293. The camera 293 is configured to capture a static image or a video. In some embodiments, the electronic device 200 may include one or N cameras 293, where N is a positive integer greater than 1.

The external memory interface 220 may be used to connect to an external storage card, for example, a micro SD card, to extend a storage capability of the electronic device 200. The external storage card communicates with the processor 210 through the external memory interface 220, to implement a data storage function. For example, files such as music and a video are stored in the external storage card.

The internal memory 221 may be configured to store computer-executable program code. The executable program code includes instructions. The processor 210 implements various function applications and data processing of the electronic device 200 by running the instructions stored in the internal memory 221. For example, in this embodiment of this application, the processor 210 may execute the instructions stored in the internal memory 221, and the internal memory 221 may include a program storage area and a data storage area.

The program storage area may store an operating system, an application required by at least one function (for example, a voice playing function or an image playing function), and the like. The data storage area may store data (such as audio data and an address book) created during use of the electronic device 200, and the like. In addition, the internal memory 221 may include a high-speed random access memory, or may include a nonvolatile memory, for example, at least one magnetic disk storage device, a flash memory, or a universal flash storage (universal flash storage, UFS).

The electronic device 200 may implement an audio function, for example, music playing and recording, through the audio module 270, the speaker 270A, the receiver 270B, the microphone 270C, the headset jack 270D, the application processor, and the like.

The button 290 includes a power button, a volume button, and the like. The button 290 may be a mechanical button or a touch button. The motor 291 may generate a vibration prompt. The motor 291 may be configured to produce an incoming call vibration prompt and a touch vibration feedback. The indicator 292 may be an indicator light, and may be configured to indicate a charging status and a power change, or may be configured to indicate a message, a missed call, a notification, and the like. The SIM card interface 295 is configured to connect to a SIM card. The SIM card may be inserted into the SIM card interface 295 or removed from the SIM card interface 295, to implement contact with or separation from the electronic device 200. The electronic device 200 may support one or N SIM card interfaces, where N is a positive integer greater than 1. The SIM card interface 295 may support a nano-SIM card, a micro-SIM card, a SIM card, and the like.

A software system of the mobile phone may use a layered architecture, an event-driven architecture, a microkernel architecture, a microservice architecture, or a cloud architecture. In this embodiment of the present invention, an Android system of a layered architecture is used as an example to illustrate a software structure of the mobile phone.

In the layered architecture, software is divided into several layers, and each layer has a clear role and task. The layers communicate with each other through interfaces. In some embodiments, the Android system is divided into four layers: an application layer, an application framework layer, an Android runtime, a system library, and a kernel layer from top to bottom.

The application layer may include a series of application packages.

Figure 2B:
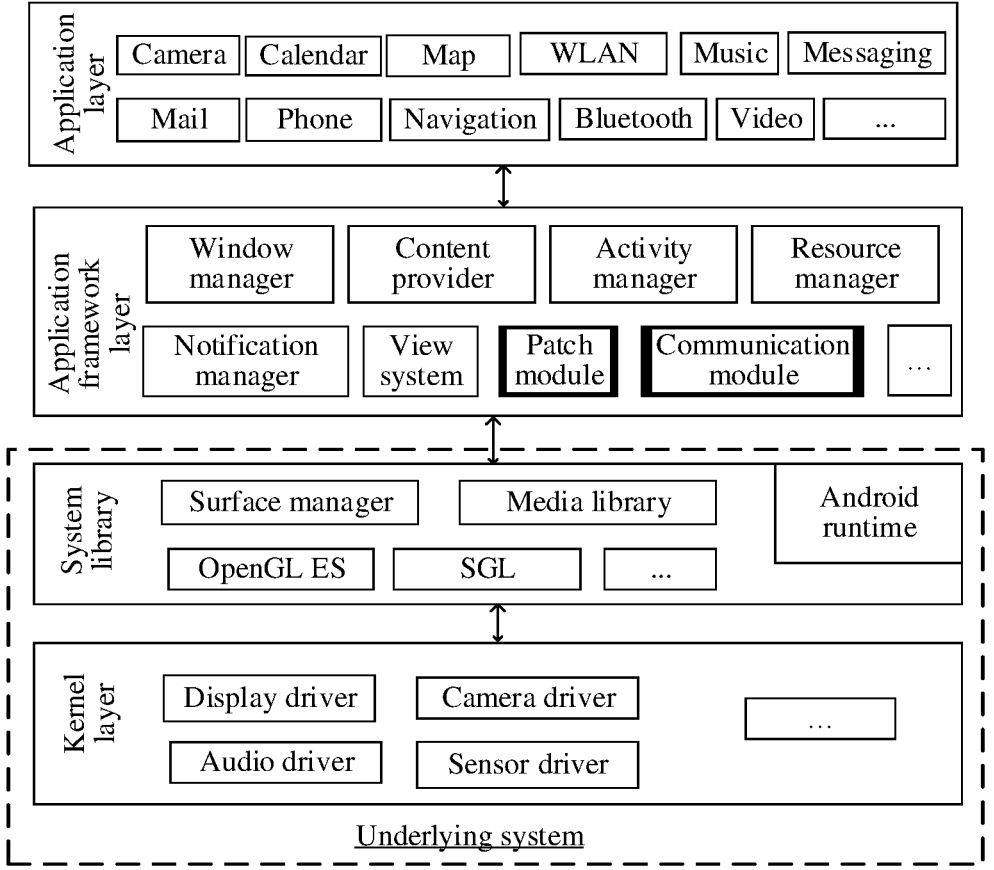
FIG. 2B is a schematic diagram of a software architecture of an electronic device according to an embodiment of this application.

As shown in FIG. 2B, the application packages may include applications such as mail, camera, gallery, calendar, phone, map, navigation, WLAN, Bluetooth, music, video, and messaging.

The application framework layer provides an application programming interface (application programming interface, API) and a programming framework for the applications at the application layer. The application framework layer includes some predefined functions.

The application framework layer may include an activity manager, a window manager, a content provider, a view system, a resource manager, a notification manager, and the like. This is not limited in this embodiment of this application.

In this embodiment of this application, the application framework layer may further include a patch module and a communication module. The patch module may be configured to search for, download, and save a patch package. The communication module may be configured to exchange information according to a communication protocol. The communication module may be configured to determine a specific message format, a transmission rate, a protocol specification, or the like.

The activity manager (Activity Manager) is configured to manage a life cycle of each application. An application usually runs in an operating system in a form of Activity. For each Activity, there is a corresponding application record (ActivityRecord) in the activity manager, and the ActivityRecord records a status of the Activity of the application. The activity manager may use the ActivityRecord as an identifier, to schedule an activity process of an application.

The window manager (Window Manager Service) is configured to manage a graphical user interface (graphical user interface, GUI) resource used on a screen, and may be specifically configured to obtain a size of the display, create and destroy a window, display and hide a window, lay out a window, manage a focus, manage an input method and wallpaper, and the like.

The system library, the kernel layer, and the like below the application framework layer may be referred to as an underlying system. The underlying system includes an underlying display system for providing a display service. For example, the underlying display system includes a display driver at the kernel layer, a surface manager in the system library, and the like.

The Android runtime (Android Runtime) includes a kernel library and a virtual machine. The Android runtime is responsible for scheduling and management of the Android system. The kernel library includes two parts: a function that needs to be invoked in Java language and a kernel library of Android. The application layer and the application framework layer run on the virtual machine. The virtual machine executes Java files at the application layer and the application framework layer as binary files. The virtual machine is configured to perform functions such as object life cycle management, stack management, thread management, security and exception management, and garbage collection.

The system library may include a plurality of function modules, for example, a surface manager (surface manager), a media library (Media Libraries), an OpenGL ES, and an SGL.

The surface manager is configured to manage a display subsystem and provide fusion of 2D and 3D layers for a plurality of applications.

The media library supports playing and recording of a plurality of commonly used audio and video formats, static image files, and the like. The media library may support a plurality of audio and video coding formats, for example, MPEG4, H.264, MP3, AAC, AMR, JPG, and PNG.

The OpenGL ES is used to implement three-dimensional graphics drawing, image rendering, synthesis, layer processing, and the like.

The SGL is a drawing engine for 2D drawing.

The kernel layer is a layer between hardware and software. The kernel layer includes at least a display driver, a camera driver, an audio driver, and a sensor driver.

For clarity and brevity of descriptions of the following embodiments, a brief description of a related concept or technology is first provided.

A patch may be software code that fixes a problem existing in various software (for example, an Android application package (Android application package, apk)/a software development kit (software development kit, sdk)) or a configuration file in software.

The following describes an operation process of patch fixing by using an example in which a first electronic device is a mobile phone and an application (for example, an AI Life APP) is installed on the mobile phone. Patch fixing may also be referred to as patch upgrade, patch update, or patch package installation. This is not limited in this application.

Figure 3A:
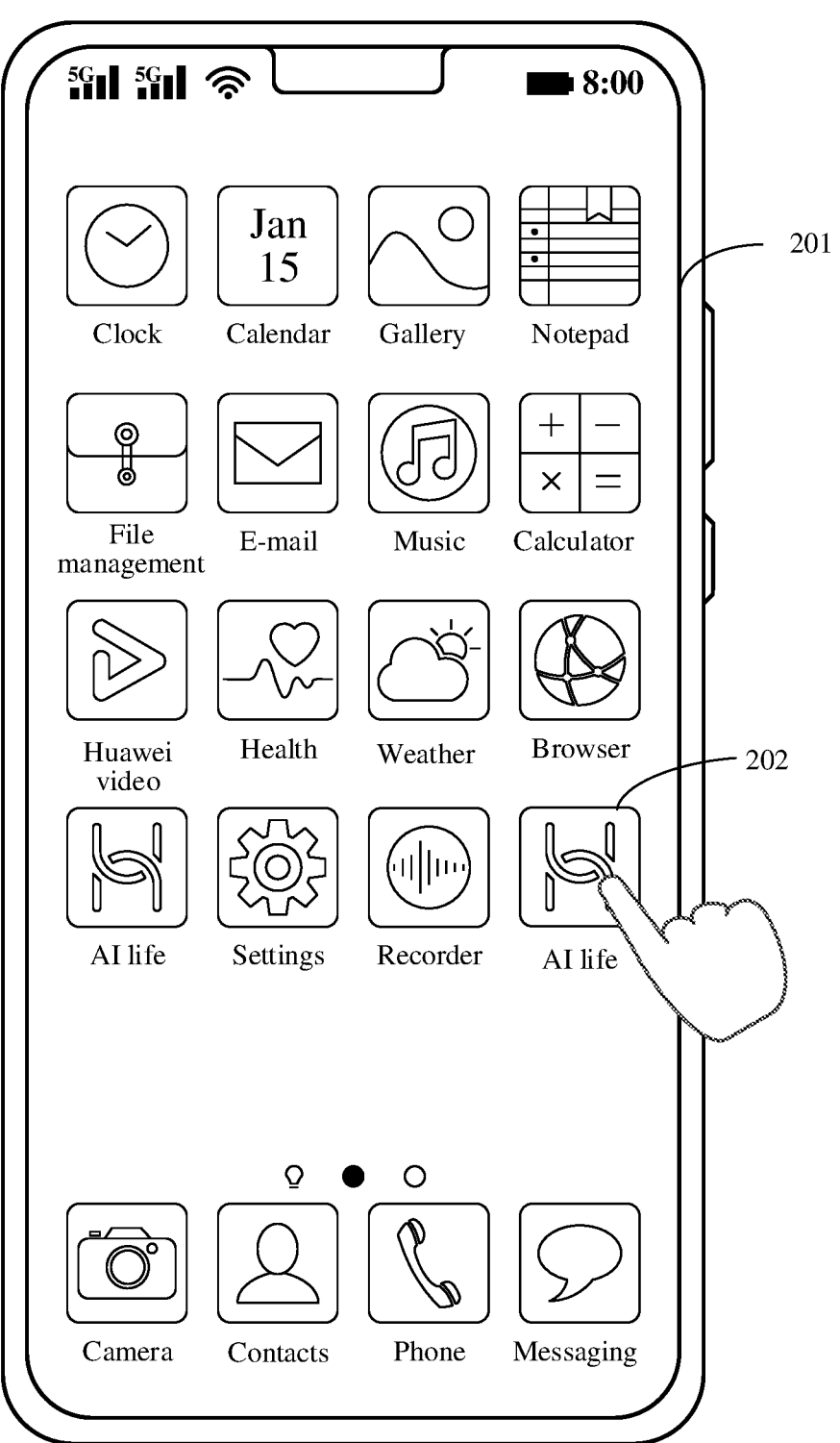
FIG. 3A(a) to FIG. 3A(c) are schematic diagrams of displays of an electronic device according to an embodiment of this application.
Figure 3A:
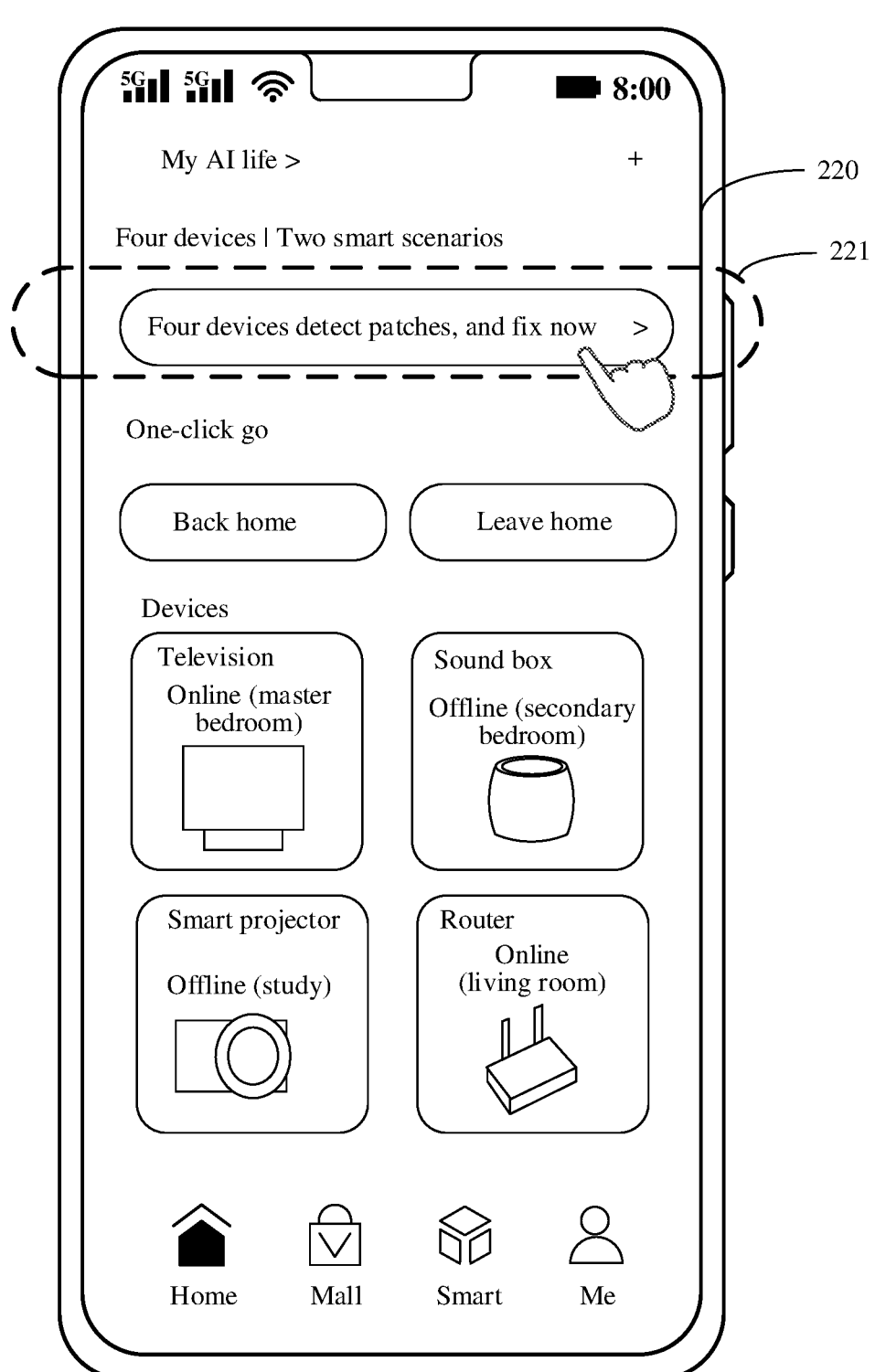
Figure 3A:
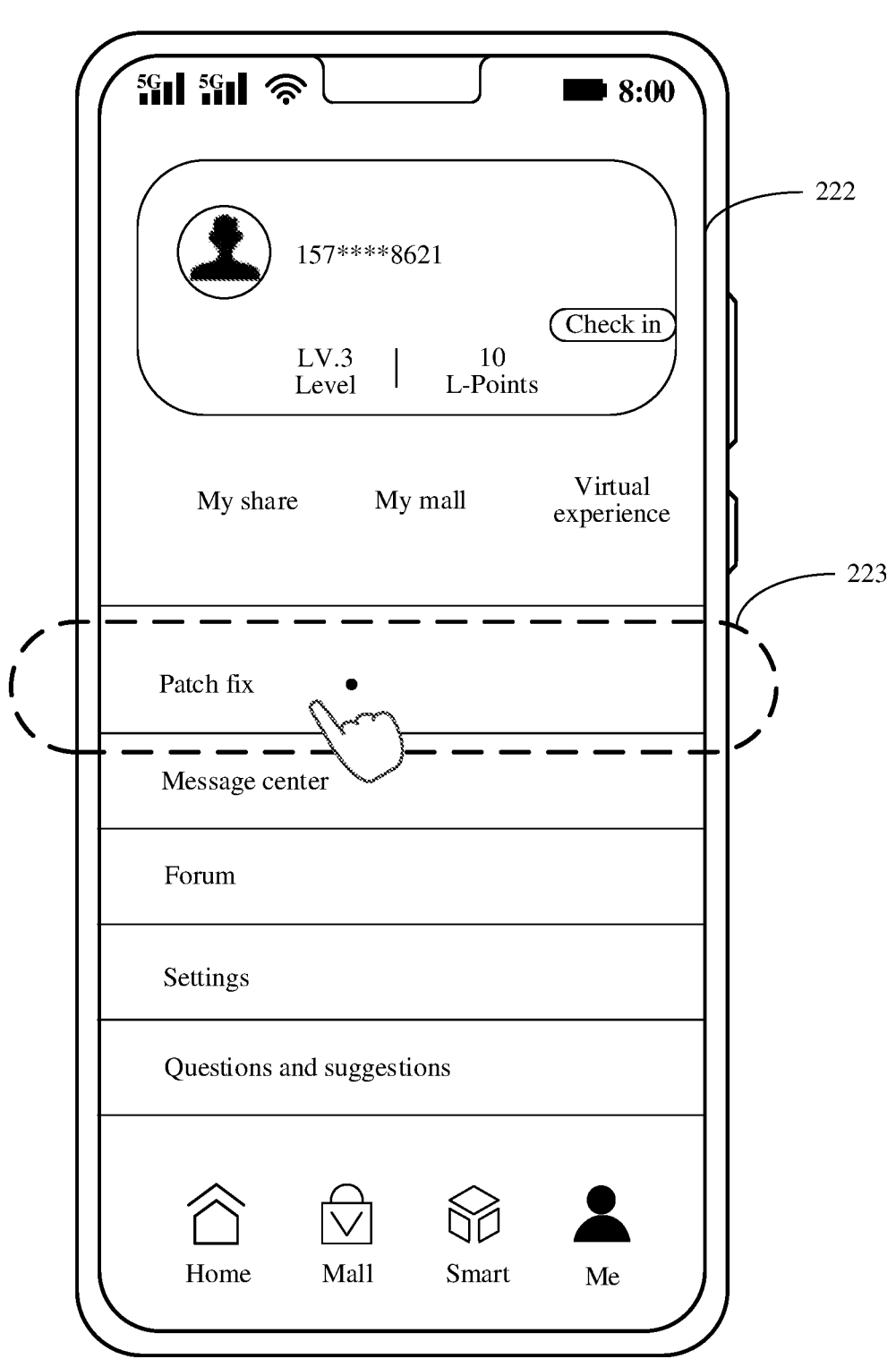
Figure 3B:
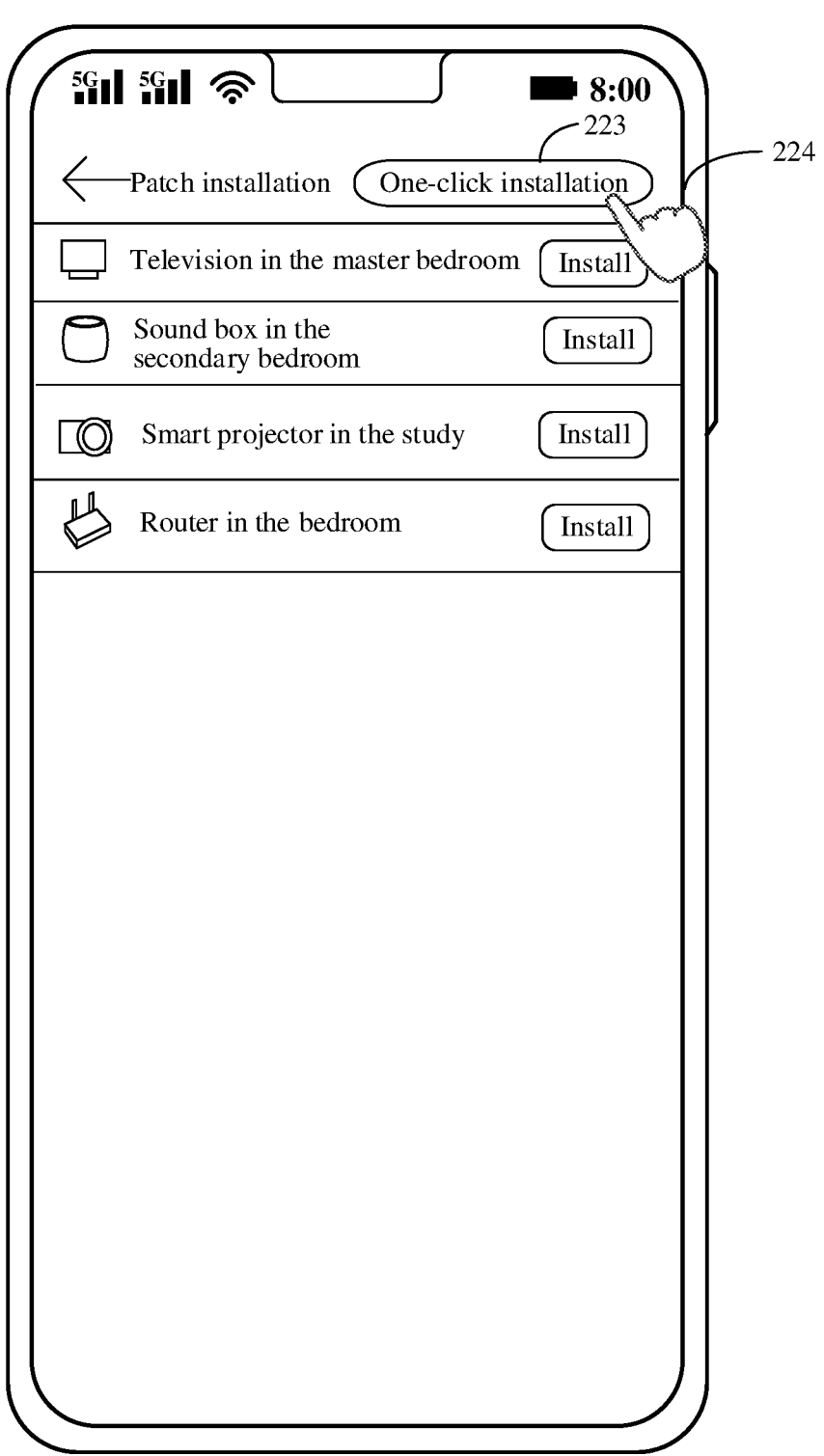
FIG. 3B(a) to FIG. 3B(c) are schematic diagrams of displays of another electronic device according to an embodiment of this application.
Figure 3B:
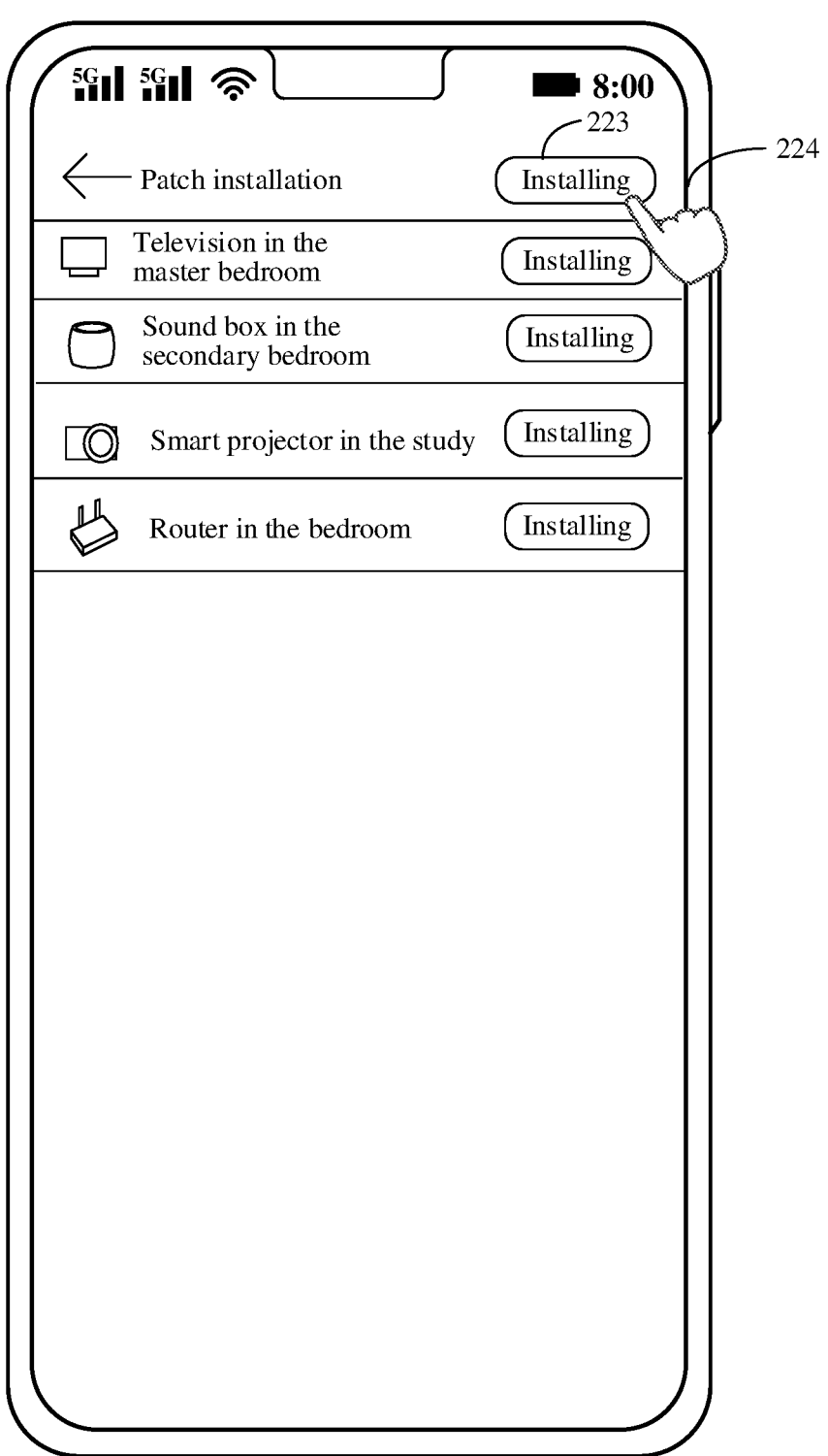
Figure 3B:
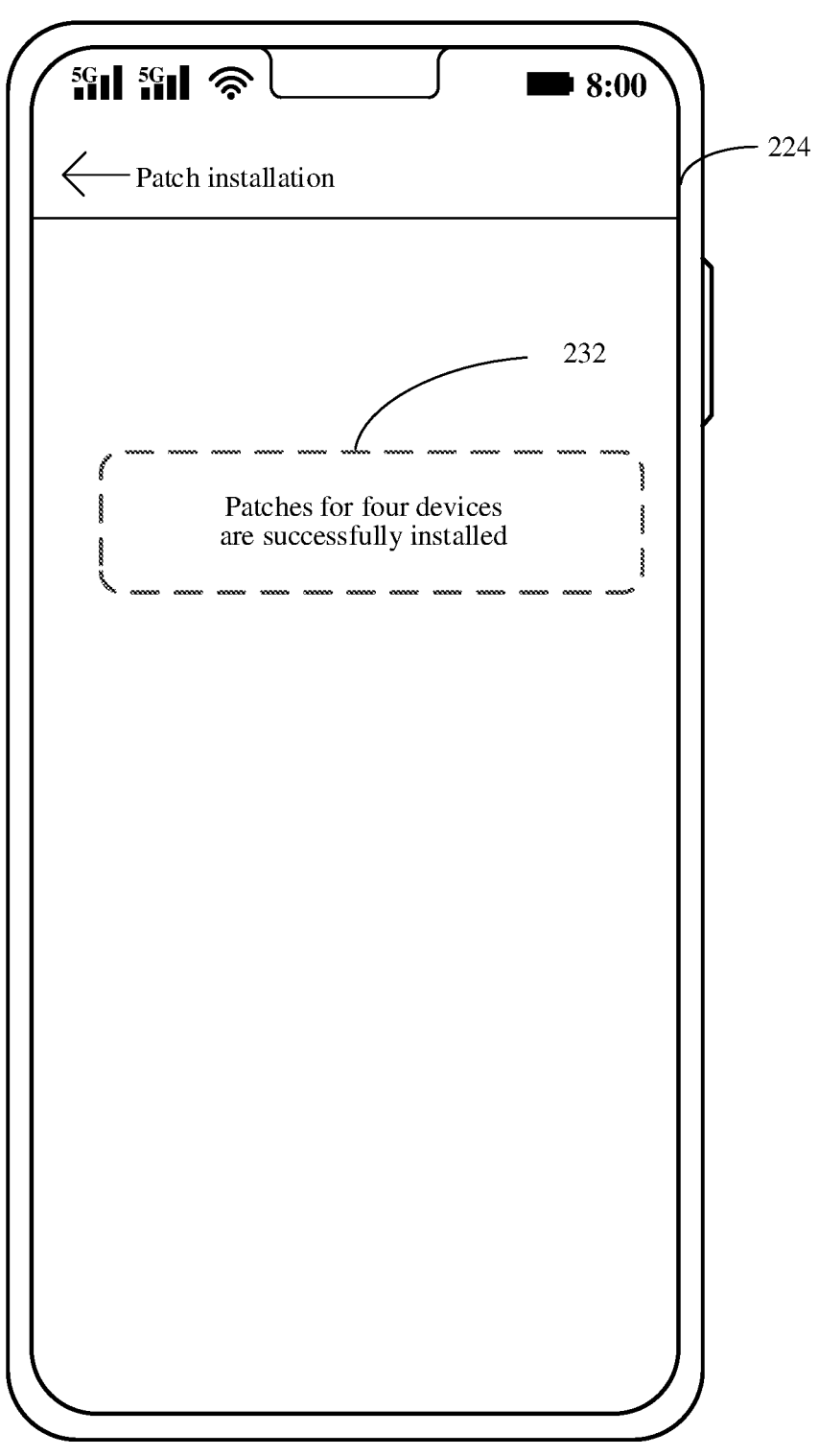

As shown in FIG. 3A(a), a home screen (namely, a desktop) 201 of the mobile phone includes an icon 202 of the AI Life application. The mobile phone may receive a tap operation performed by a user on the icon 202 of the AI Life application, and in response to the tap operation, the mobile phone may open the AI Life application. As shown in FIG. 3A(b), when the user opens the AI Life APP and enters a home page 220 of the AI Life APP, the mobile phone may display a prompt text "Four devices detect patches, and fix now" in a prompt box (or a search box) 221. In response to an operation of tapping the prompt box 221 by the user, as shown in FIG. 3A(c), the mobile phone may display an interface 222. The interface 222 may include a patch fix option 223. In the patch fix option 223, a prompt dot (for example, a small black dot or a small red dot) may be used to prompt that a patch for a device is to be used for fixing. In response to an operation of tapping the patch fix option 223 by the user, as shown in FIG. 3B(a), the mobile phone may display an interface 224. The interface 224 includes four to-be-upgraded devices: a television in a master bedroom, a speaker in a secondary bedroom, a smart projector in a study, and a router in a living room. Each electronic device corresponds to an installation button of a patch. For example, in response to an operation of tapping a one-click installation button 223 by the user, as shown in FIG. 3B(b), a prompt text on an installation button of each electronic device may change to "Installing", indicating that a patch for the device is being installed. After a patch package for each electronic device is successfully installed, as shown in FIG. 3B(c), a prompt text 232 may be displayed in the interface 224, to prompt the user that the patches for the current four electronic devices have been successfully installed.

Optionally, as shown in FIG. 3B(a), the user may click an installation button of a patch corresponding to a specific electronic device, to install the patch for the device. Alternatively, the user may perform a multi-selection operation on installation buttons corresponding to a plurality of electronic devices, to simultaneously install patches for the plurality of electronic devices.

Figure 3C:
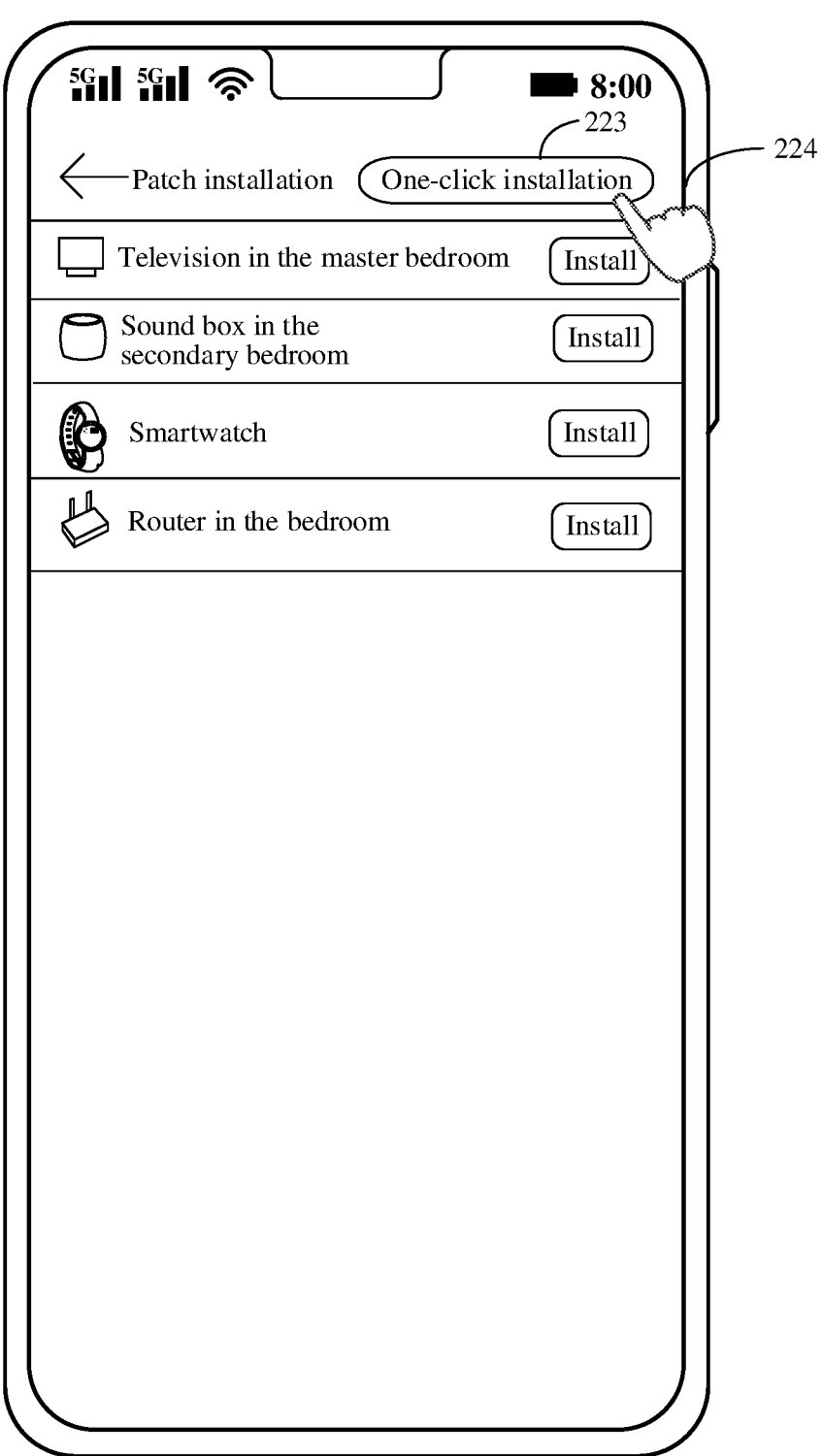
FIG. 3C(a) and FIG. 3C(b) are schematic diagrams of displays of another electronic device according to an embodiment of this application.
Figure 3C:
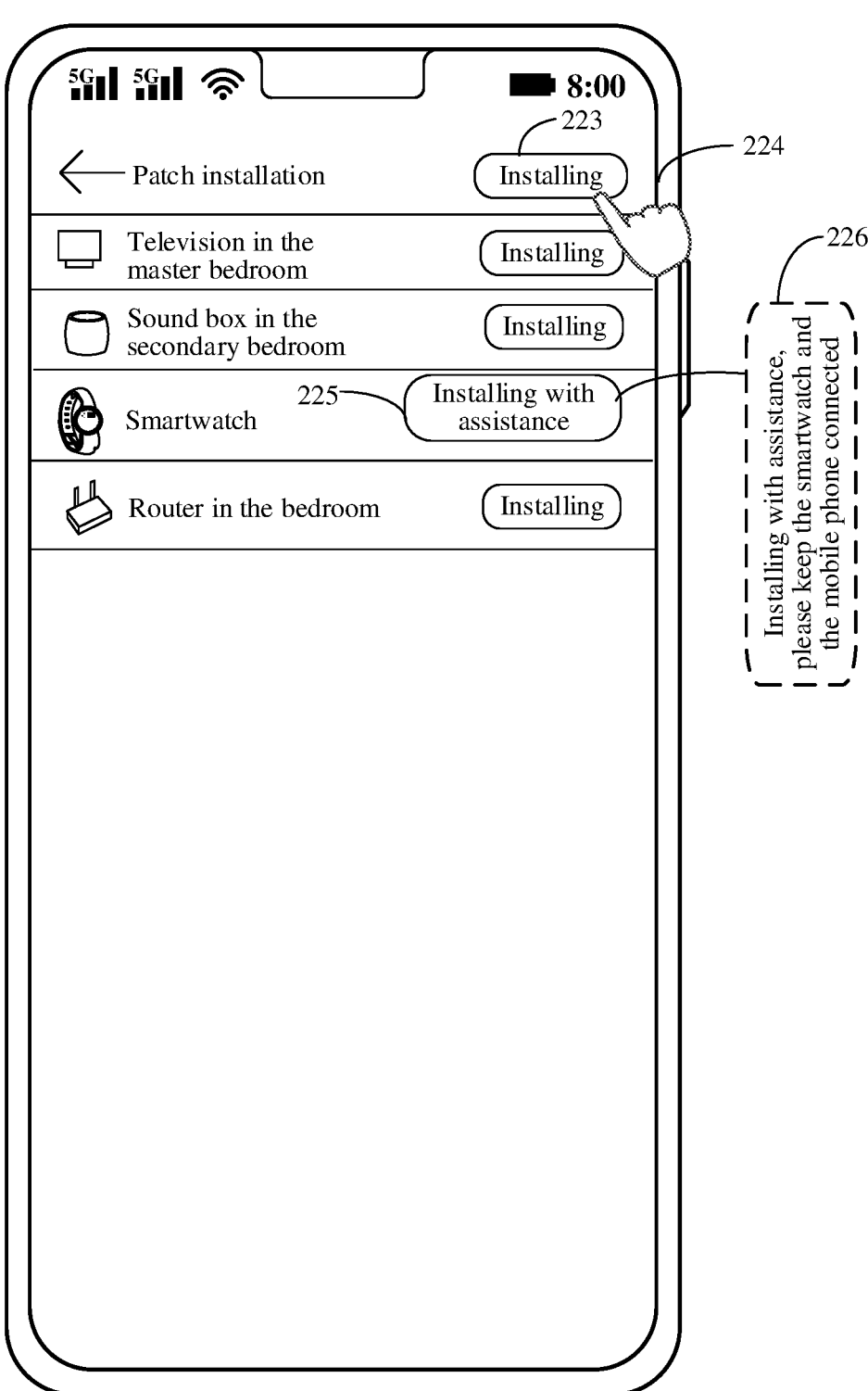

In a possible design, as shown in FIG. 3C(a), the interface 224 includes four to-be-upgraded devices: a television in a master bedroom, a speaker in a secondary bedroom, a smartwatch, and a router in a living room. A patch package for the smartwatch needs to be installed with assistance of the mobile phone, and a connection between the smartwatch and the mobile phone needs to be maintained during patch package installation. As shown in FIG. 3C(b), in response to an operation of tapping a one-click installation button 223 by the user, a prompt text 226 "In assisted installation, please keep the connection between the smartwatch and the mobile phone" may be displayed in a scrolling manner on an installation button 225 corresponding to the smartwatch.

The following describes patch fixing processes. A method according to an embodiment of this application may include the following processes: (1) searching for a patch package; (2) downloading the patch package; and (3) installing the patch package.

The following describes the process (1) (namely, the process of searching for a patch package).

First, a first electronic device determines an electronic device (which may be referred to as a package search device for short) configured to search for a patch package. The first electronic device may be a mobile phone, a PC, a tablet computer, or the like. The first electronic device may communicate with a plurality of electronic devices according to a communication protocol, and may manage the plurality of electronic devices.

The first electronic device may determine the package search device based on a type of an electronic device. The type of the electronic device may include a first type and a second type. Refer to the foregoing related descriptions. Details are not described herein again. In a possible design, if an electronic device is a first-type electronic device, the first-type electronic device may be a package search device.

For example, as shown in FIG. 4A(1), the plurality of electronic devices managed by the first electronic device may include a router 101, a mobile phone 102, a television 103, a sound box 104, a mobile phone 105, a smartwatch 106, a tablet computer 107, a smart headset 108, and a sound box 109. Devices of the first type may include the router 101, the mobile phone 102, the mobile phone 105, and the tablet computer 107.

If there are a plurality of first-type electronic devices, one or more electronic devices may be selected from the plurality of first-type electronic devices as package search devices. For example, as shown in FIG. 4A(1), four electronic devices, for example, the router 101, the mobile phone 102, the mobile phone 105, and the tablet computer 107, may all be used as package search devices. Alternatively, two electronic devices, for example, the mobile phone 102 and the tablet computer 107, may be selected as package search devices.

Alternatively, the first electronic device may determine the package search device based on a device type and a load value (load value) of each electronic device. The load value is used to indicate a load status of the electronic device, and a larger load value indicates a higher load of the electronic device. The first electronic device may send a request to the plurality of electronic devices managed by the first electronic device. After receiving the request from the first electronic device, each electronic device may send a load value of the electronic device to the first electronic device. The first electronic device may manage a plurality of load values in a unified manner. After the load value of one electronic device changes, a changed load value may be resent to the first electronic device.

In a possible design, if a load value of an electronic device is less than a first preset threshold, and the electronic device is a first-type electronic device, the first electronic device determines that the electronic device is a package search device. When load values of N electronic devices are all less than the first preset threshold, and all the N electronic devices are first-type electronic devices, all the N first-type electronic devices may be package search devices, or M electronic devices may be selected from the N first-type electronic devices as package search devices.

For example, as shown in FIG. 4B(1) and FIG. 4B(2), the devices of the first type may include a router 101, a mobile phone 102, a mobile phone 105, and a tablet computer 107.

It is assumed that the first preset threshold is equal to 1, a load value of the mobile phone 102 is equal to 0, and a load value of the tablet computer 107 is equal to 0. That is, the load values of the mobile phone 102 and the tablet computer 107 are less than 1. In this case, the mobile phone 102 and the tablet computer 107 may be used as package search devices.

Alternatively, a package search device may be determined based on an attribute and a device type of an electronic device. The attribute of the electronic device may include interactivity of the electronic device, where the interactivity is used to indicate a frequency of information exchange between the electronic device and another device (for example, a server). For example, interactivity of electronic devices running the following services is in descending order: a network call (for example, a video call or a voice call)>an instant messaging call>a game>reading>screen locking. For example, interactivity of an electronic device running a game application is higher than interactivity of an electronic device running a reading application.

Optionally, the first electronic device may determine the package search device once every preset period. For example, the package search device may be determined once every one day, three days, five days, or seven days.

After determining the package search device, the first electronic device may send a control message to the package search device, to trigger the package search device to initiate a process of searching for a patch package. After receiving the control message, the package search device may initiate the process of searching for a patch package. There may be one or more package search devices. Certainly, the first electronic device may determine that the first electronic device is used as the package search device. In this case, the first electronic device may directly initiate a process of searching for a patch package without sending a control message.

In a possible design, the package search device may search for patch packages for all electronic devices managed by the first electronic device, that is, search for all types of patch packages.

In another possible design, each of a plurality of package search devices supports patch group search. The patch group search means that each package search device searches for a patch package of a different type. Types of patch packages may include an application package (for example, an apk) type, a resource file (overlay) type, a software framework (fwk) type, a native framework (native) type, a kernel (kernel) type, and the like. Different types of patch packages are used to fix different types of software. Alternatively, the types of patch packages may include another type, for example, a patch type obtained after the patch types such as the apk type, the fwk type, or the kernel type are normalized. This is not limited in this application.

In a possible design, a type of a patch package searched for by a package search device may be determined based on an operating system of the package search device. For example, an electronic device with an Android operating system may search for a patch package of at least one of the apk type, the overlay type, the fwk type, the native type, the kernel type, or the like. An electronic device with a Harmony operating system may search for a patch package of at least one of the apk type, the fwk type, or the kernel type. Alternatively, the electronic device with the Harmony operating system may search for a patch package of the patch type obtained after the types such as the apk type, the fwk type, or the kernel type are normalized, that is, one patch type may be used to cover fixing of all software problems on the electronic device.

In another possible design, a type of a patch package searched for by a package search device may be determined based on a device resource of the package search device. The device resource of the package search device may include at least one of a capacity of a memory or a processing speed of a processor.

For example, an electronic device whose memory capacity exceeds (greater than or equal to) a second preset threshold may search for a patch package of the apk type, and an electronic device whose memory capacity does not exceed (less than) the second preset threshold may search for a patch package of the overlay type, the fwk type, the native type, or the kernel type. The second preset threshold may be 10 M, 100 M, 1000 M, or the like. The electronic device whose memory capacity exceeds the second preset threshold may be a mobile phone, a router, a tablet computer, or the like. The electronic device whose memory capacity does not exceed the second preset threshold may be a smart air conditioner, a refrigerator, a washing machine, or the like. For example, the mobile phone may search for the patch package of the apk type, and the tablet computer may search for the patch package of the native or kernel type.

For another example, an electronic device whose processing speed of a processor exceeds a third preset threshold may search for a patch package of the apk or fwk type, and an electronic device whose processing speed of a processor does not exceed the third preset threshold may search for a patch package of the native or kernel type. The third preset threshold may be 1 KHz, 10 KHz, 100 KHz, or the like. The electronic device whose processing speed of the processor exceeds the third preset threshold may be a mobile phone, a router, a tablet computer, a television, a PC, a notebook computer, or the like. The electronic device whose processing speed of the processor does not exceed the third preset threshold may be a smart air conditioner, a refrigerator, a washing machine, or the like.

In still another possible design, a type of a patch package searched for by a package search device may be determined based on an operating system of the package search device and a device resource of the package search device. For example, the type of the patch package searched for by the package search device may be determined based on the operating system of the package search device and a capacity of a memory of the package search device. Alternatively, the type of the patch package searched for by the package search device may be determined based on the operating system of the package search device and a processing speed of a processor of the package search device.

That a package search device initiates searching for a patch package means that the package search device sends a package search message to a server. The package search message may include identities (identifier, ID) of a plurality of electronic devices managed by the first electronic device. For example, the package search message may include identities of all electronic devices managed by the first electronic device, or the package search message may include a first identifier. The first identifier may indicate the plurality of electronic devices managed by the first electronic device.

Figure 4C:
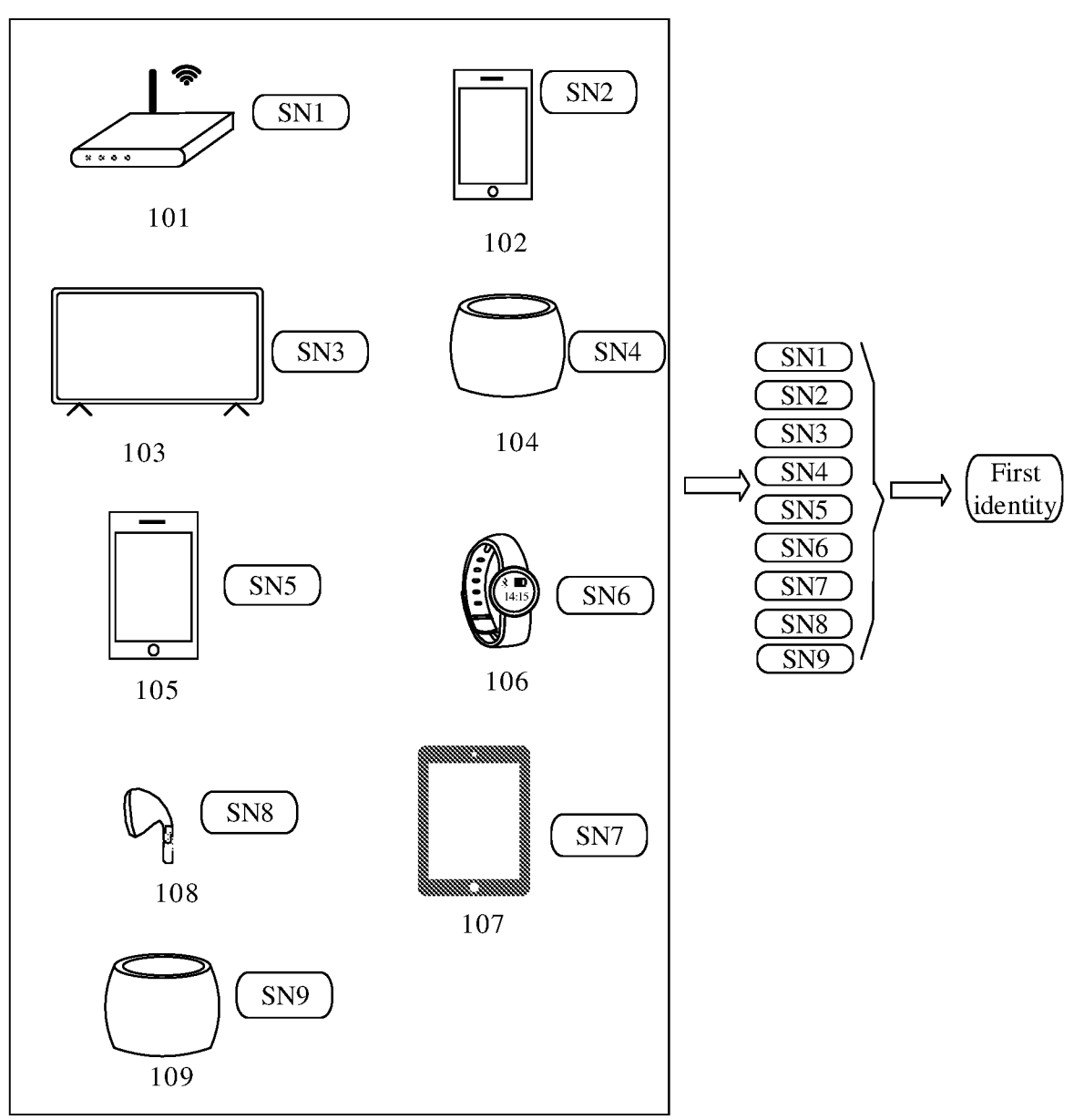
FIG. 4C is a schematic diagram of generating a first identifier according to an embodiment of this application.

The first identifier may be allocated by the server. The server may generate one unique identifier, namely, the first identifier, based on features of all or some electronic devices that are connected in a home network according to a communication protocol. For example, as shown in FIG. 4C, the first identifier may be obtained by performing an inverse operation based on product serial numbers (serial number, SN) of the plurality of electronic devices, and the server may calculate the SNs of the plurality of electronic devices based on the first identifier. The SNs of the plurality of electronic devices may be sent to the server by the package search device when the package search device searches for the patch package for the first time. Alternatively, the server may use a same account (for example, a Huawei account) corresponding to the plurality of electronic devices as the first identifier. For example, a Huawei account to which the plurality of electronic devices have logged in may be used as the first identifier.

Further, the package search message may include software version information (for example, system versions) of a plurality of electronic devices (for example, all the electronic devices managed by the first electronic device).

Figure 5A:
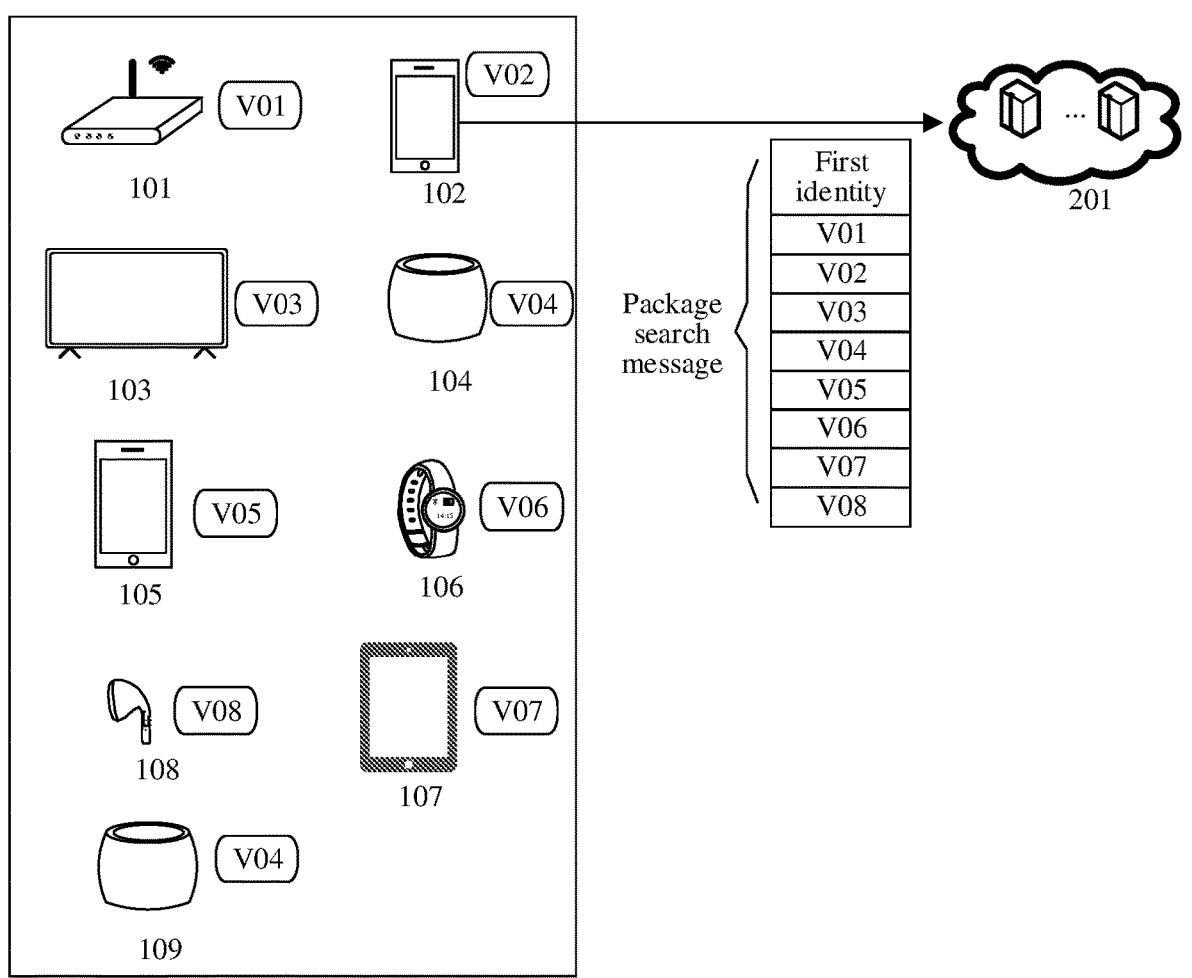
FIG. 5A is a schematic diagram of sending a package search message according to an embodiment of this application.

For example, as shown in FIG. 5A, it is assumed that the plurality of electronic devices include a router 101, a mobile phone 102, a television 103, a sound box 104, a mobile phone 105, a smartwatch 106, a tablet computer 107, a smart headset 108, and a sound box 109. A software version corresponding to the router 101 is V01, a software version corresponding to the mobile phone 102 is V01, a software version corresponding to the television 103 is V03, a software version corresponding to the sound box 104 is V04, a software version corresponding to the mobile phone 105 is V05, a software version corresponding to the smartwatch 106 is V06, a software version corresponding to the tablet computer 107 is V07, a software version corresponding to the smart headset 108 is V08, and a software version corresponding to the sound box 109 is V04. The software version corresponding to the sound box 104 and the software version corresponding to the sound box 109 each may be V04. The package search device is the mobile phone 102. In addition to carrying the first identifier, the package search message sent by the mobile phone 102 to the server 201 may further carry version information V01, V01, V03, V04, V05, V06, V07, and V08 respectively corresponding to the router 101, the mobile phone 102 (namely, the mobile phone 102 itself), the television 103, the sound box 104, the mobile phone 105, the smartwatch 106, the tablet computer 107, the smart headset 108, and the sound box 109.

Optionally, the package search message may further carry device model information of the plurality of electronic devices corresponding to the first identifier. This is because software version information of some devices may indicate device model information of the devices, but software version information of some other devices cannot indicate type information of the devices, and the type information needs to be additionally notified to the server.

Figure 5B:
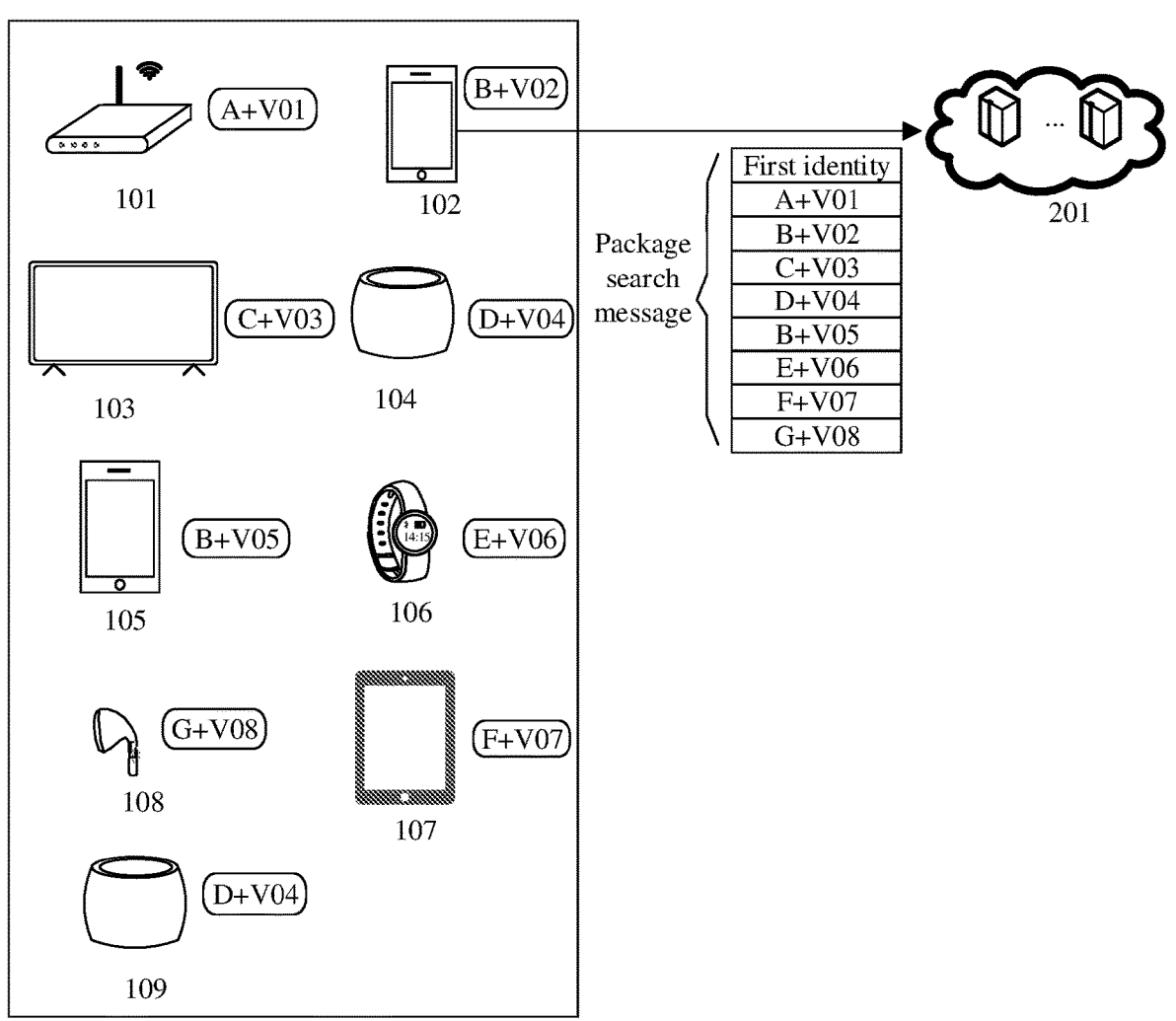
FIG. 5B is another schematic diagram of sending a package search message according to an embodiment of this application.

For example, based on the description of FIG. 5A, as shown in FIG. 5B, it is assumed that a device model corresponding to the router 101 is A, a device model corresponding to the mobile phone 102 is B, a device model corresponding to the television 103 is C, a device model corresponding to the sound box 104 is D, a device model corresponding to the mobile phone 105 is B, a device model corresponding to the smartwatch 106 is E, a device model corresponding to the tablet computer 107 is F, a device model corresponding to the smart headset 108 is G, and a device model corresponding to the sound box 109 is D. The device model corresponding to the mobile phone 102 and the device model corresponding to the mobile phone 105 each may be B, and the device model corresponding to the sound box 104 and the device model corresponding to the sound box 109 each may be D. In addition to carrying the first identifier, the package search message sent by the mobile phone 102 to the server 201 may further carry device model information and software version information A+V01, B+V02, C+V03, D+V04, B+V05, E+V06, F+V07, and G+V08 respectively corresponding to the router 101, the mobile phone 102 (namely, the mobile phone 102 itself), the television 103, the sound box 104, the mobile phone 105, the smartwatch 106, the tablet computer 107, the smart headset 108, and the sound box 109.

Optionally, if there are a plurality of package search devices, in addition to including the first identifier and the software version information of the plurality of electronic devices indicated by the first identifier, package search messages sent by different package search devices may further include types of patch packages searched for by the different package search devices.

Figure 5C:
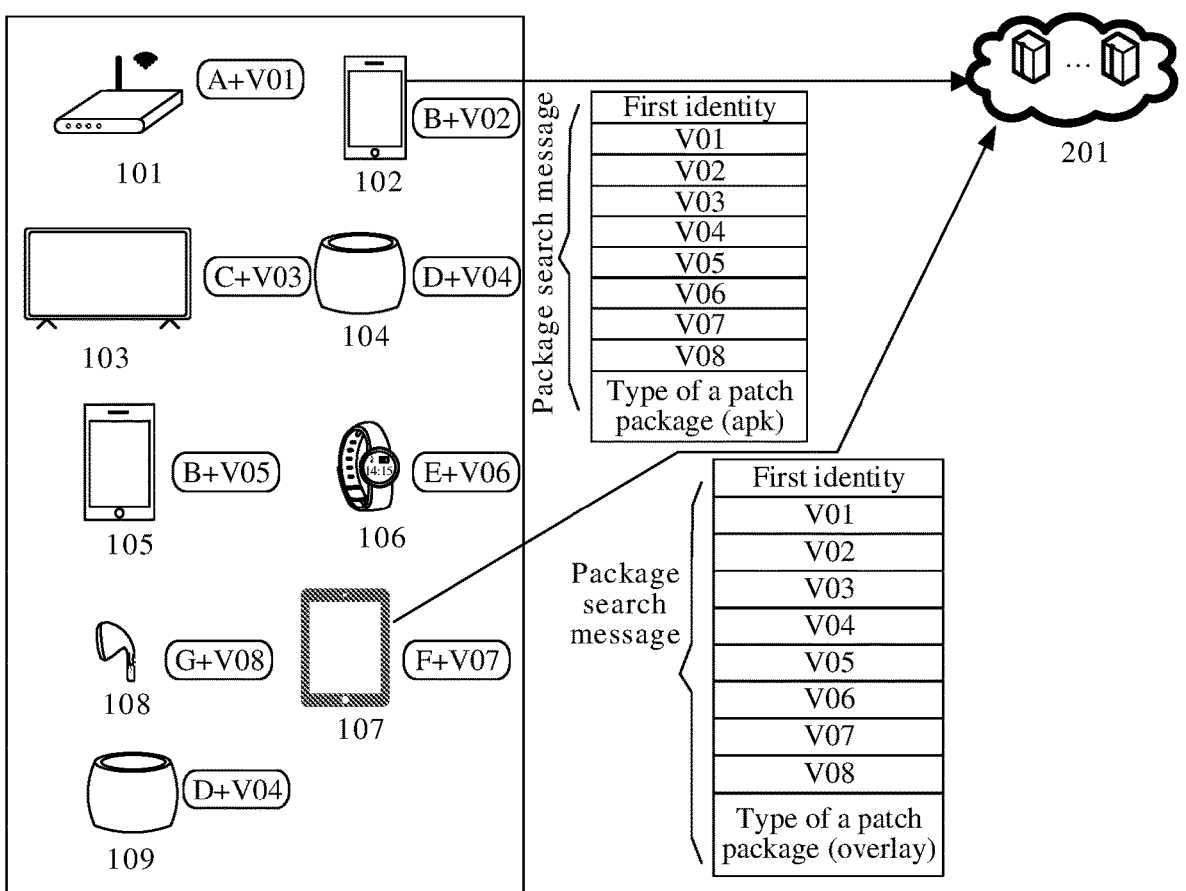
FIG. 5C is another schematic diagram of sending a package search message according to an embodiment of this application.

For example, as shown in FIG. 5C, a patch package type included in a package search message sent by the mobile phone 102 may be the apk type, and a patch package type included in a package search message sent by the tablet computer 107 may be the overlay type. In this way, the server may separately send different types of patch packages to different package search devices. In this way, resources (processing resources, storage resources, or the like) of different electronic devices can be fully utilized, thereby avoiding excessively high resource consumption of one electronic device.

After receiving a package search message, the server may parse the package search message to obtain identities of a plurality of electronic devices and software version information respectively corresponding to the plurality of electronic devices. Optionally, device model information respectively corresponding to the plurality of electronic devices may be further obtained. The server may search for patch packages respectively corresponding to the plurality of electronic devices, and send a return message to the package search device. The return message includes a patch search result. The patch search result may be that none of the plurality of electronic devices has a patch package, or some or all of the plurality of electronic devices have patch packages. If some or all of the plurality of electronic devices have patch packages, optionally, the return message may further include version number information, uniform resource locator (uniform resource locator, URL) address information, patch size information, changelog (changelog) information, or the like of the patches for the some or all of the electronic devices.

Figure 6A:
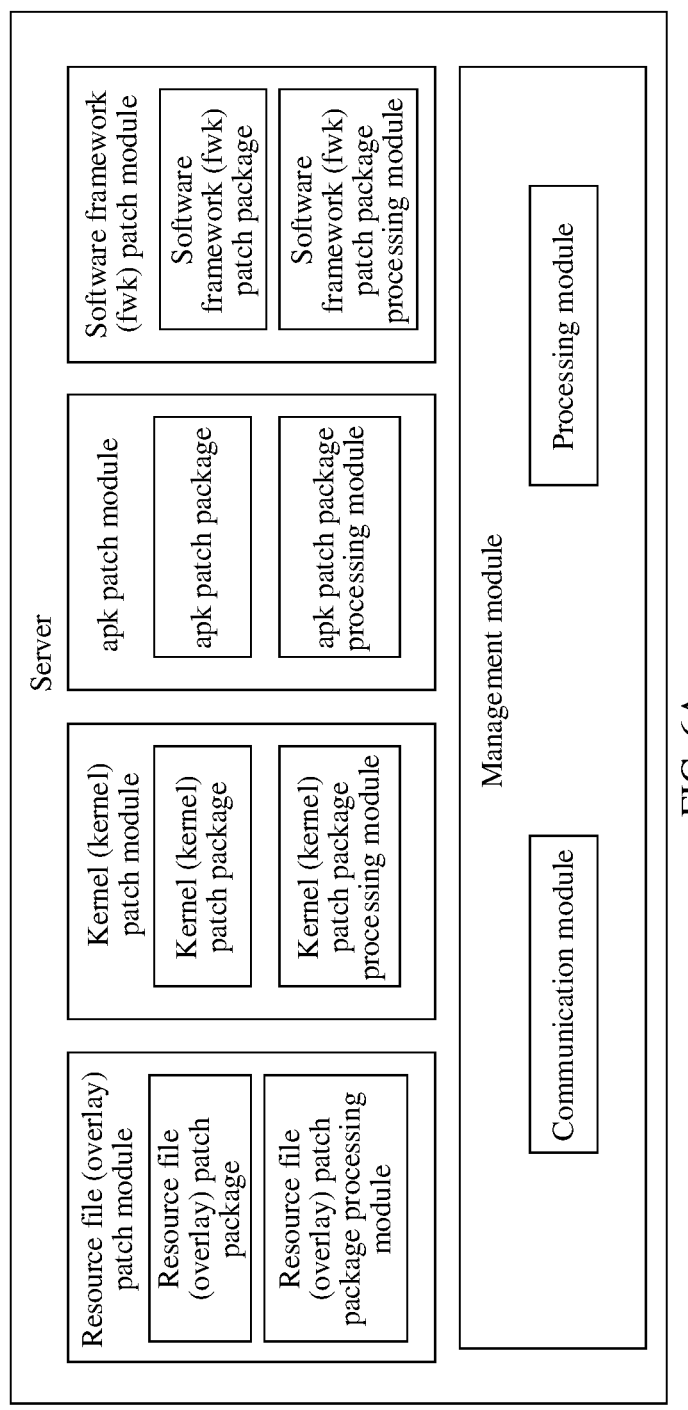
FIG. 6A is a schematic diagram of an internal structure of a server according to an embodiment of this application.

In a possible design, the server may include different modules (or partitions), and the different modules have different functions. For example, as shown in FIG. 6A, the server may include a management module and different patch modules. For example, the server may include an overlay patch module, a kernel patch module, an apk patch module, and an fwk patch module. The management module may include a communication module and a processing module. After the communication module receives a package search message from a package search device, the package search message may be parsed by the processing module. The apk patch module may include an apk patch processing module, and the apk patch processing module may process an apk patch package stored in the apk patch module. The overlay patch module may include an overlay patch processing module, and the overlay patch processing module may process an overlay patch package stored in the overlay patch module. The fwk patch module may include an fwk patch processing module, and the fwk patch processing module may process an fwk patch package stored in the fwk patch module. The kernel patch module may include a kernel patch processing module, and the kernel patch processing module may process a kernel patch package stored in the kernel patch module. That is, different types of patch packages may be discretely distributed on different patch modules on the server, and different patch modules include different patch package processing modules to process corresponding patch packages.

After receiving a package search message by using the communication module, the server may parse the package search message by using the processing module. For example, the processing module of the server may determine, based on software version information of each electronic device, types of patch packages respectively corresponding to a plurality of electronic devices. After the types of the patch packages are determined, the management module may search for a corresponding patch package from a corresponding patch module. For example, if the types of the patch packages corresponding to the plurality of electronic devices include two types, namely, the apk type and the overlay type, the patch packages may be respectively searched for from the apk patch module and the overlay patch module.

Figure 6B:
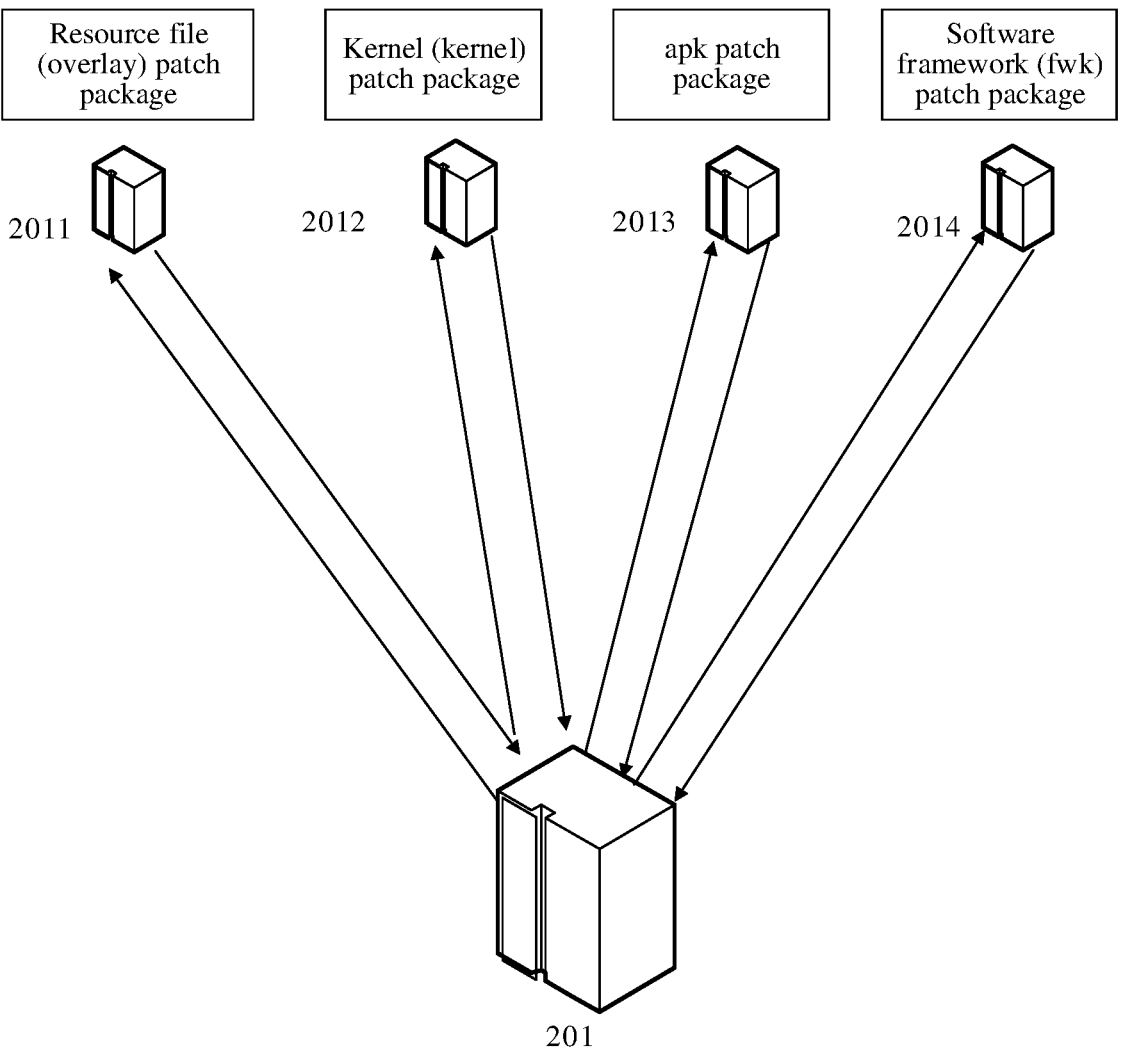
FIG. 6B is a schematic diagram of a system architecture of a server according to an embodiment of this application.

In another possible design, a cloud side may include a plurality of servers, and different servers have different functions. For example, as shown in FIG. 6B, the cloud side may include a server 201, a server 2011, a server 2012, a server 2013, and a server 2014. The server 201 may be a routing server, and the server 2011, the server 2012, the server 2013, and the server 2014 may be patch servers. Different patch servers may include different types of patches. For example, the server 2011 may be an overlay patch server, the server 2012 may be a kernel patch server, the server 2013 may be an apk patch server, and the server 2014 may be an fwk patch server.

After receiving a package search message, the routing server may determine, based on software version information of each electronic device, types of patch packages respectively corresponding to a plurality of electronic devices. After determining the types of the patch packages, the routing server may search for a corresponding patch package from a corresponding patch server. For example, if the types of the patch packages corresponding to the plurality of electronic devices include two types, namely, the apk type and the overlay type, the patch packages may be respectively searched for from the apk patch server and the overlay patch server.

In a possible design, the server may store a plurality of first identities. When electronic devices corresponding to some first identities have patch packages, patch information may be pushed (that is, information about the patch packages is pushed) based on these first identities. The server may push the patch information to a plurality of electronic devices corresponding to each first identifier. For example, it is assumed that the devices corresponding to the first identifier include a mobile phone 1, a tablet 1, and a television 1. If patch packages for the mobile phone 1 and the tablet 1 have updates, the server may push information about the patch packages to the mobile phone 1 and/or the tablet 1. After receiving a push message, the mobile phone 1 and the tablet 1 may prompt a user to download and install the patch packages.

The following describes the process (2) (namely, the process of downloading the patch package).

After an electronic device receives a return message sent by the server, if the return message indicates that some or all of the plurality of electronic devices corresponding to the first identifier have patch packages, as shown in FIG. 3A(a), the electronic device may prompt the user that the device has a patch package, and the user determines whether to download a corresponding patch package.

If the user determines to download the corresponding patch package, or the user sets to automatically download the corresponding patch package, a package search device may send, to the server, a message for determining to download the patch package. After receiving the message that is for determining to download the patch package and that is sent by the electronic device, the server may repack the patch package. To be specific, the server may pack patch packages corresponding to the plurality of electronic devices corresponding to the first identifier together and send the patch packages to an electronic device that initiates a package search. In this way, the plurality of electronic devices corresponding to the first identifier do not need to separately download the patch packages, and electronic devices of a same version do not need to repeatedly download a patch package, so that communication resources can be saved. In addition, the user does not need to separately download patch packages, thereby simplifying a user operation and improving user experience.

Figure 6C:
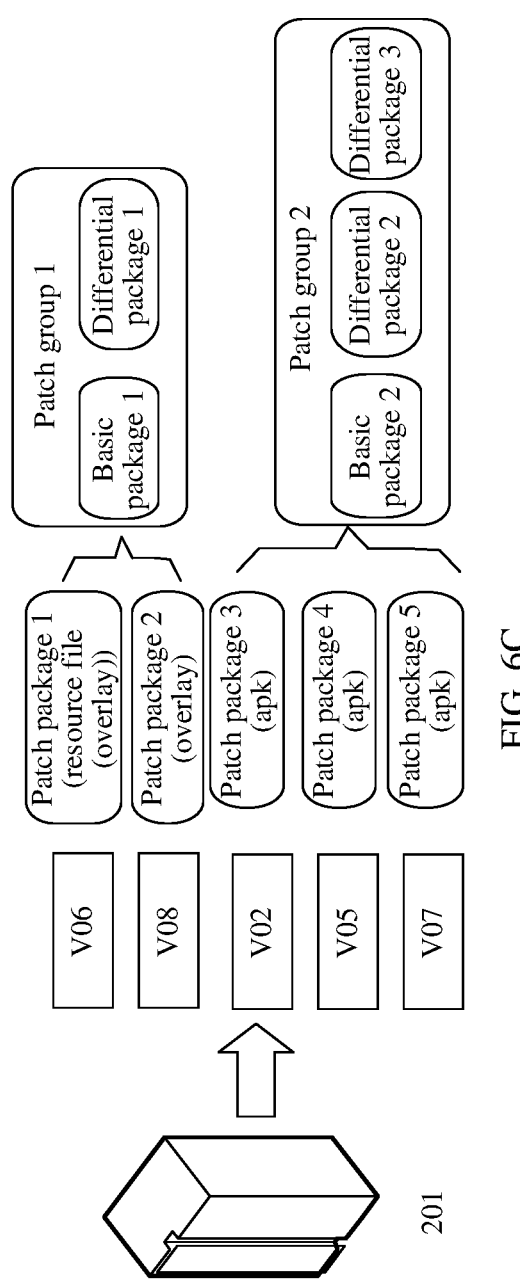
FIG. 6C is a schematic diagram of processing patch packages by a server according to an embodiment of this application.

For example, as shown in FIG. 6C, it is assumed that the smartwatch 106 and the smart headset 108 in the electronic devices corresponding to the first identifier have patch packages, namely, a patch package 1 and a patch package 2 that are patch packages of the overlay type, and the mobile phone 102, the mobile phone 105, and the tablet computer 107 also have patch packages, namely, a patch package 3, a patch package 4, and a patch package 5 that are patch packages of the apk type. The server 201 may pack different types of patch packages into different patch groups (or referred to as patch package combinations). For example, patch packages of the overlay type may be packed into a patch group 1, and patch packages of the apk type may be packed into a patch group 2. A patch group refers to a plurality of patch packages obtained after differential storage is performed on patch packages of a same type, and the patch group includes a basic package and a differential package. For example, the patch group 1 includes a basic package 1 and a differential package 1. The basic package 1 includes all data of one overlay patch package (for example, a patch package 1), and the differential package 1 includes differential data between another overlay patch package (for example, a patch package 2) and the basic package. The patch group 2 includes a basic package 2, a differential package 2, and a differential package 3. The basic package 2 includes all data of one apk patch package (for example, a patch package 3), the differential package 2 includes differential data between another apk patch package (for example, a patch package 4) and the basic package, and the differential package 3 includes differential data between still another apk patch package (for example, a patch package 5) and the basic package.

It should be noted that most data in patch packages used to fix a same problem of electronic devices of different software versions and/or device models is the same, and only a few pieces of data are different. Therefore, a differential storage manner may be used to ensure that the patch packages used to fix a same problem occupy fewer resources.

Figure 6D:
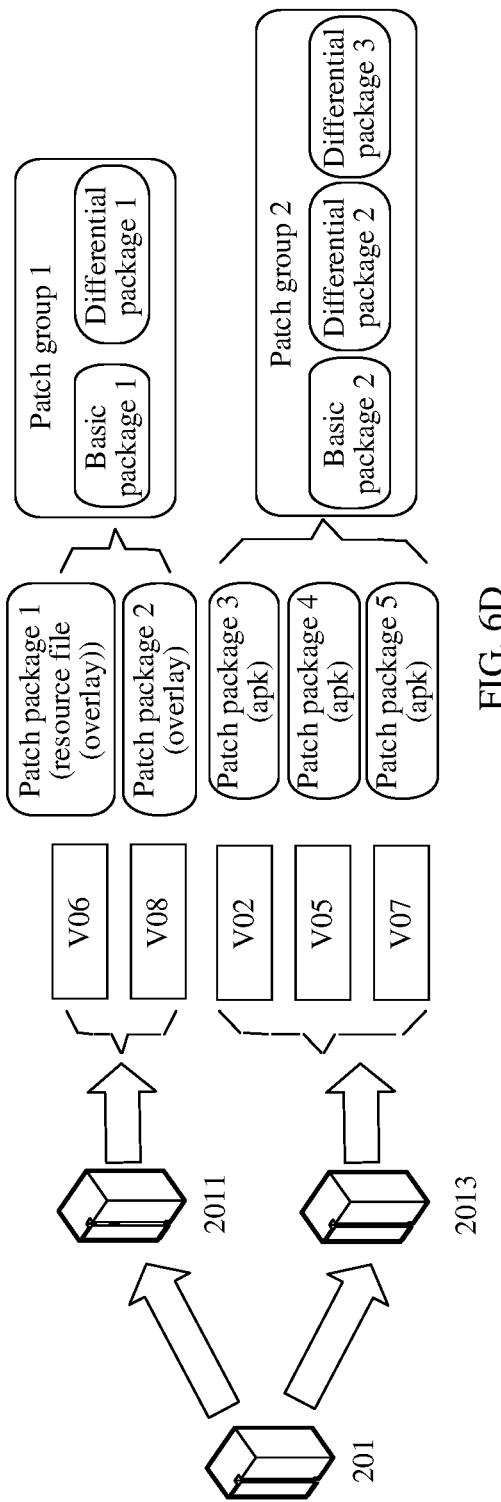
FIG. 6D is another schematic diagram of processing patch packages by a server according to an embodiment of this application.

In another possible design, as shown in FIG. 6D, the routing server 201 may request different types of patch packages from different patch servers (for example, the server 2011 and the server 2013). After receiving corresponding requests, the different patch servers may obtain corresponding patch packages, and may pack a plurality of patch packages of a same type into a combined patch package and return the combined patch package to the routing server. The routing server may return the combined patch package to a package search device. For example, the server 201 may respectively request a patch package of the overlay type and a patch package of the apk type from the server 2011 and the server 2013. For the combined patch package, refer to the foregoing related descriptions. Details are not described herein again.

Figure 7A:
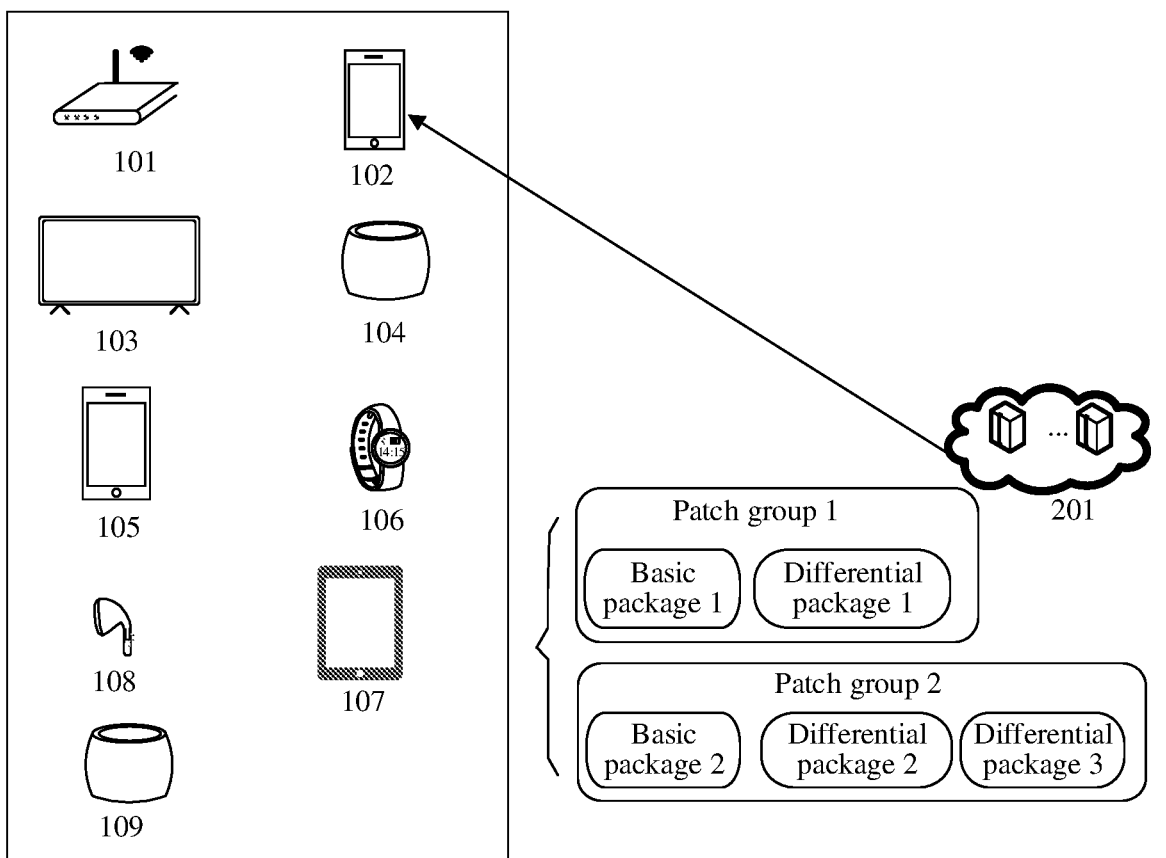
FIG. 7A is a schematic diagram of sending a patch package group by a server according to an embodiment of this application.

In a possible implementation, if there is only one package search device, the package search device may search for all types of patch packages, and the server may send all types of patch packages to the package search device. As shown in FIG. 7A, if the mobile phone 102 is used as a package search device to search for all types of patch packages, the server may send the patch group 1 and the patch group 2 to the mobile phone 102.

Figure 7B:
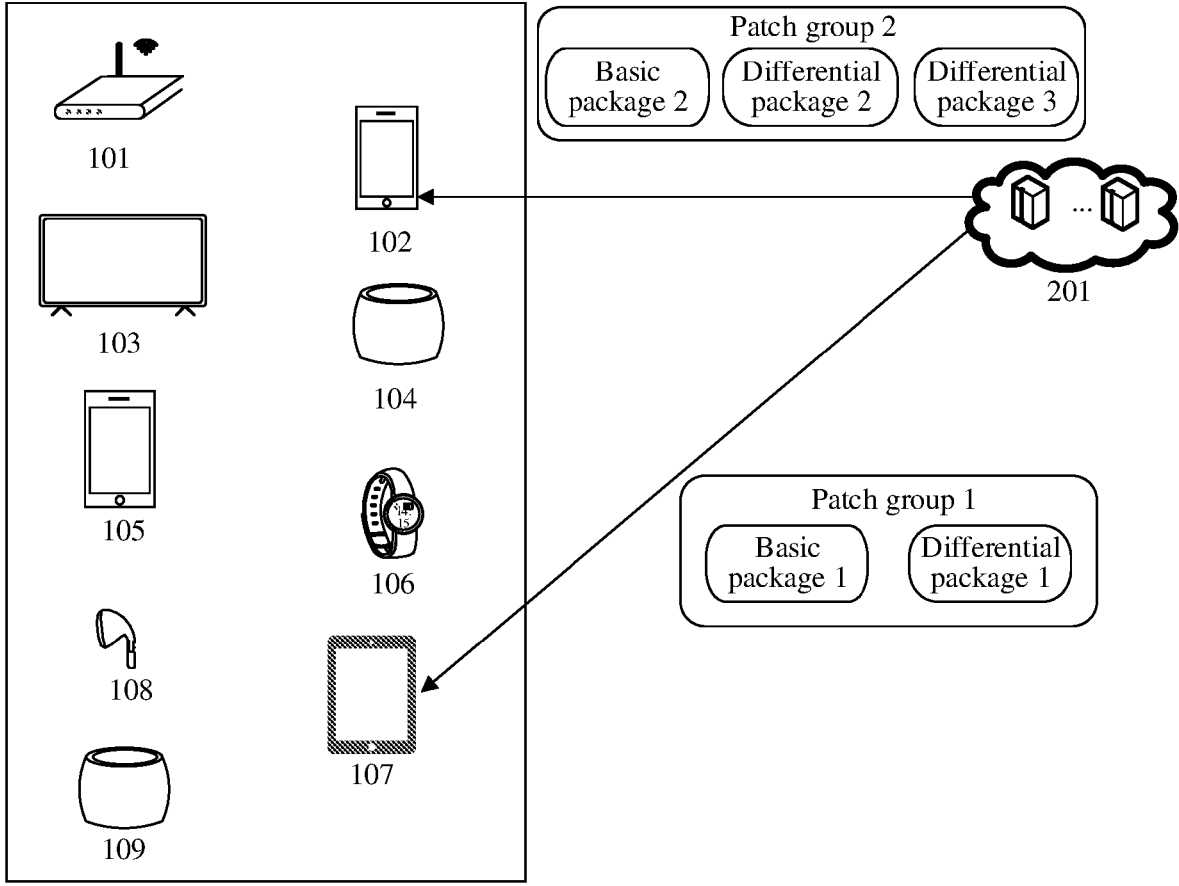
FIG. 7B is another schematic diagram of sending a patch package group by a server according to an embodiment of this application.

In another possible implementation, if a plurality of package search devices respectively search for different types of patch packages, the server may respectively send different types of patch packages to different package search devices. As shown in FIG. 7B, if the mobile phone 102 is used as a package search device to search for one type of patch package (for example, a patch package of the apk type), and the tablet computer 107 is used as a package search device to search for another type of patch package (for example, a patch package of the overlay type), the server may send the patch group 2 to the mobile phone 102 and send the patch group 1 to the tablet computer 107.

The following describes the process (3) (namely, the process of installing the patch).

Figure 8:
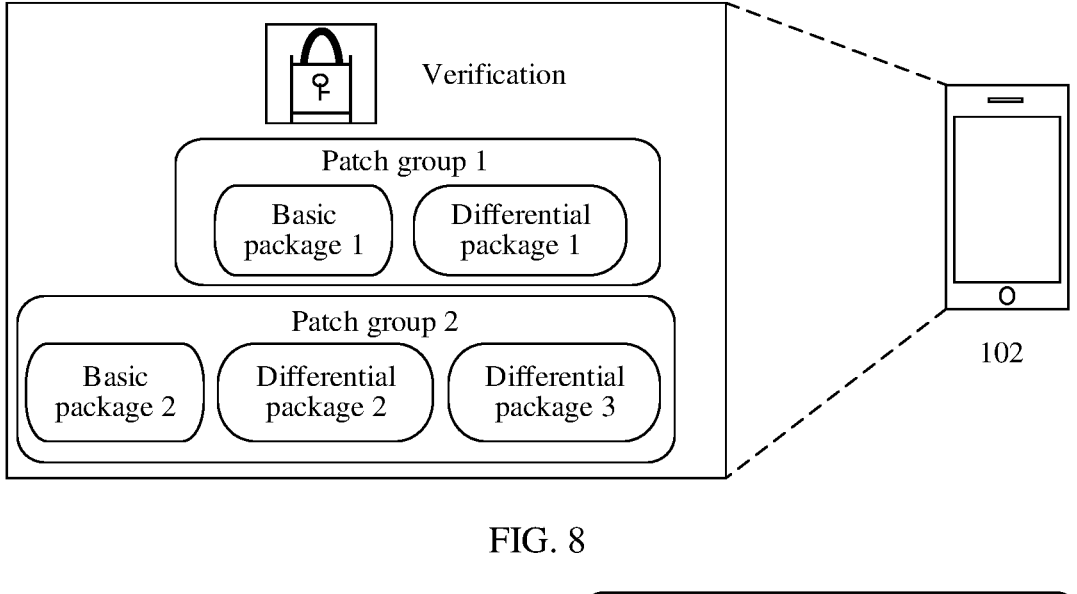
FIG. 8 is a schematic diagram of verifying a patch package group by a mobile phone according to an embodiment of this application.

After obtaining a patch package (a patch package group), a package search device may perform authentication verification on the patch package. As shown in FIG. 8, if a mobile phone 102 receives a patch package group 1 and a patch package group 2 from a server, the mobile phone 102 may verify the patch package group 1 and the patch package group 2. For example, foolproof verification may be performed on the patch package group 1 and the patch package group 2, then security verification is performed, then a differential package is restored, and file verification is performed after the restoration. After the verifications are completed, if an electronic device having a patch package is online, the package search device may directly send the patch package to the online electronic device, the online electronic device may directly install the patch package, and then the package search device may delete the distributed patch package. If the electronic device having a patch package is not online, the package search device may store the patch package in a patch set (which may also be referred to as a patch pool or a buffer pool of patch packages), and after being online, the electronic device may obtain the patch package from the patch set and install the patch package.

Whether the electronic device is online refers to whether the electronic device can communicate with the package search device by using a communication protocol. When the electronic device is powered on and a communication function is normal, the electronic device may communicate with the package search device by using the communication protocol, that is, the electronic device is online. When the electronic device is faulty or powered off, the electronic device cannot communicate with the package search device by using the communication protocol, that is, the electronic device is offline.

The first electronic device may establish a patch set based on parameters such as a device type and a load value of an online electronic device. For example, a patch set may be established on an electronic device whose device type is a first type and whose load value is less than a fourth preset threshold. The patch set may be mounted on the electronic device, or may be stored in the electronic device in a form of a file system.

Figure 9A:
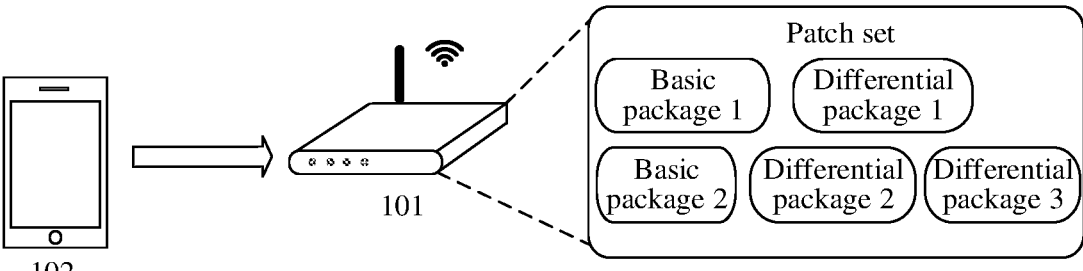
FIG. 9A is a schematic diagram of a patch set according to an embodiment of this application.

For another example, the first electronic device may create a patch set on an electronic device that is always online. The electronic device that is always online may be, for example, a router. As shown in FIG. 9A, a mobile phone 102 may send a verified patch package group 1 and a verified patch package group 2 to a router 101. In other words, a patch set on the router 101 may include the patch package group 1 and the patch package group 2.

Figure 9B:
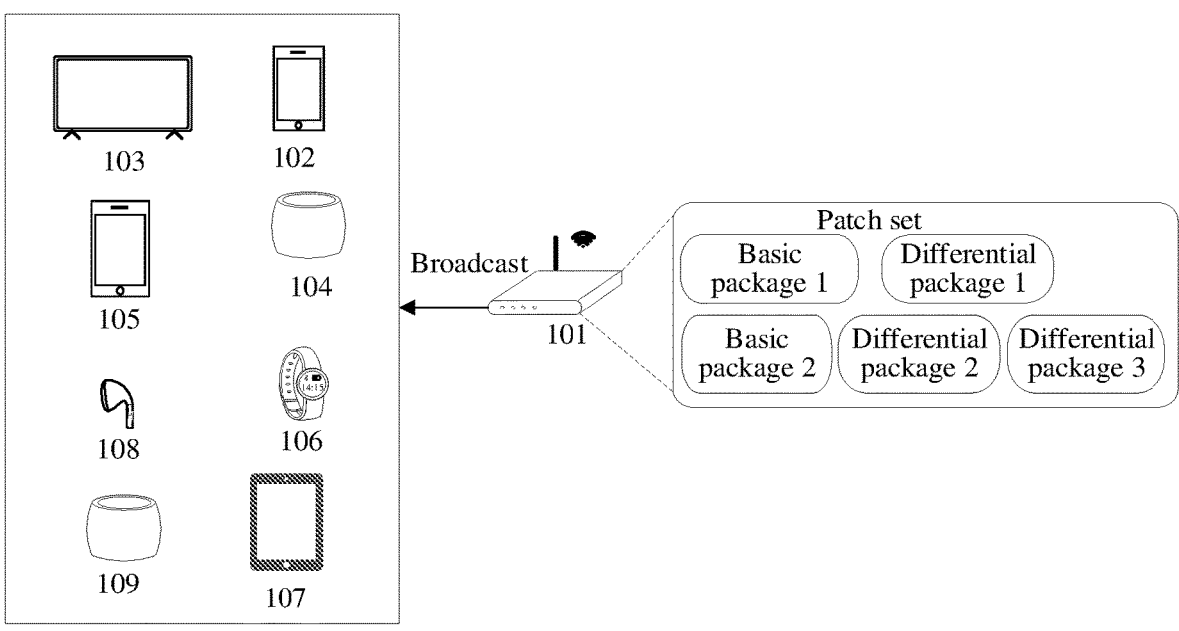
FIG. 9B is a schematic diagram of broadcasting a patch set according to an embodiment of this application.

An electronic device on which a patch package set is established may broadcast information about the patch set, so that another electronic device can learn of the information about the patch set. As shown in FIG. 9B, a router 101 may broadcast information about a patch set to other electronic devices (for example, a mobile phone 102, a television 103, a sound box 104, a mobile phone 105, a smartwatch 106, a tablet computer 107, a smart headset 108, and a sound box 109). The information about the patch set may include a cache address of a patch.

Alternatively, an electronic device on which a patch package set is established may share/push the patch set to each electronic device in a network as a "virtual device". In this way, the patch set may be "exposed" in the entire network, and each electronic device may obtain a required patch from the patch set for installation.

After the patch set is established, when a device on a terminal side actively initiates patch package installation, the device may preferentially search for a patch package in the patch set to install the patch package. If the patch set does not contain a related patch package, a package search may be initiated to a cloud side.

In another possible design, when actively initiating a process of searching for a patch package, an electronic device may search for the patch package from both the cloud side and the patch set. If a patch package on the cloud side has a same version as a patch package in the patch set, the patch package in the patch set is directly obtained. If the version of the patch package on the cloud side is later than that of the patch package in the patch set, the patch package is obtained from the cloud side, and update of the patch set may be triggered at the same time (to be specific, the patch packages for the plurality of electronic devices corresponding to the first identifier are re-searched for, and a patch package of an earlier version in the patch set is replaced with a patch package of a later version).

In addition, when an electronic device (a mobile phone or a tablet computer) that leaves the home network initiates a patch package search, that is, sends a package search message to the server, the package search message may carry an identifier of the electronic device, and may carry the first identifier. After receiving the package search message, the server sends patch package information corresponding to the electronic device to the electronic device, so that the current electronic device may download and install a patch. In addition, the server may send the patch packages for the plurality of electronic devices corresponding to the first identifier to an electronic device (for example, a router) in the home network. The electronic device may store the patch packages for the plurality of electronic devices in a patch set (for example, send the patch packages to an electronic device on which a patch package set is established), so that each electronic device selects and installs a patch package.

In a possible case, if the electronic device on which a patch package set is established is powered off or faulty, and consequently another electronic device cannot find a patch package in the patch set, the another electronic device may wait for a period of time and then re-initiate a package search. Alternatively, after the electronic device on which a patch package set is established goes online again, the electronic device may broadcast information about the patch packages in the patch set again. In this way, a device that previously searches for a patch package may search the patch set for the patch package.

After obtaining the patch package from the patch set, the electronic device may directly install the patch package. This is because the patch package in the patch set has been verified, and when installing the patch package, the electronic device does not need to verify the patch package, so that an installation time can be reduced.

In a possible case, some electronic devices do not have a capability of independently installing a patch, and need assistance of another electronic device in patch upgrade. An electronic device that does not have the capability of independently installing a patch may be, for example, a smartwatch, a headset, or a sound box. An electronic device that can assist in upgrade may be, for example, a mobile phone or a tablet computer.

For example, the smartwatch may obtain patch information of the smartwatch from a patch set. The patch information of the smartwatch may include an identifier of an electronic device (for example, an identifier of a mobile phone) that assists in patch package installation. The smartwatch may initiate a patch installation assistance request to the mobile phone, and the mobile phone obtains a patch package for the smartwatch from the patch set for installation.

In another possible implementation, the mobile phone may obtain, from the patch set, a patch package combination associated with the device. The patch package combination includes a patch package for the device (namely, a patch package for the mobile phone), and further includes a patch package for the smartwatch. The mobile phone may assist the smartwatch in patch package installation.

Figure 10:
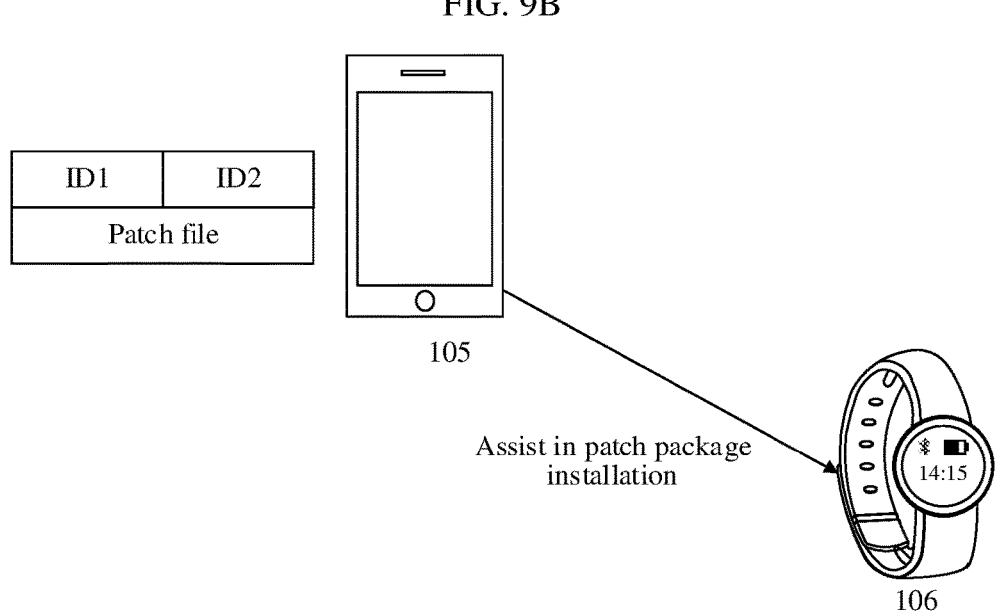
FIG. 10 is a schematic diagram of assisting in installing a patch package according to an embodiment of this application.

As shown in FIG. 10, a mobile phone obtains, from a patch set, a patch package that includes an identifier ID1 of the mobile phone and an identifier ID2 of a smartwatch, and the mobile phone may parse the patch package to obtain a patch file of the smartwatch. The mobile phone may assist the smartwatch in patch package installation in the following manners.

Assisted upgrade manner 1 (a mirror image manner): When the mobile phone has a capability of parsing a complex patch package, and the smartwatch can only install a patch file of a file system of a system of the smartwatch, the assisted upgrade manner may be used. Specifically, the mobile phone may place a patch image file, obtained by parsing, in a patch partition directory through Bluetooth or NFC, or in another short-distance communication manner, the patch partition directory is mounted to the smartwatch, and a patch takes effect (equivalent to that a patch package is written into the smartwatch).

Assisted upgrade manner 2 (a shared directory manner): The smartwatch provides a directory in which a patch file can be placed, the directory allows an attribute of the patch file to be modified, the mobile phone obtains, through identifier identification, permission for the directory in which the patch file can be placed, the patch file is placed under the directory, and a patch takes effect.

Assisted upgrade manner 3 (a virtual device block mode): The mobile phone mounts a patch file of the smartwatch to the smartwatch as a driver peripheral, the driver peripheral exists when a connection is established between the mobile phone and the smartwatch, and a patch takes effect; and when the connection between the mobile phone and the smartwatch is disconnected, the driver peripheral does not exist, and the patch becomes invalid.

Based on the foregoing assisted upgrade manners, a problem that a patch cannot be installed on an electronic device, for example, a smartwatch, can be resolved.

Figure 11:
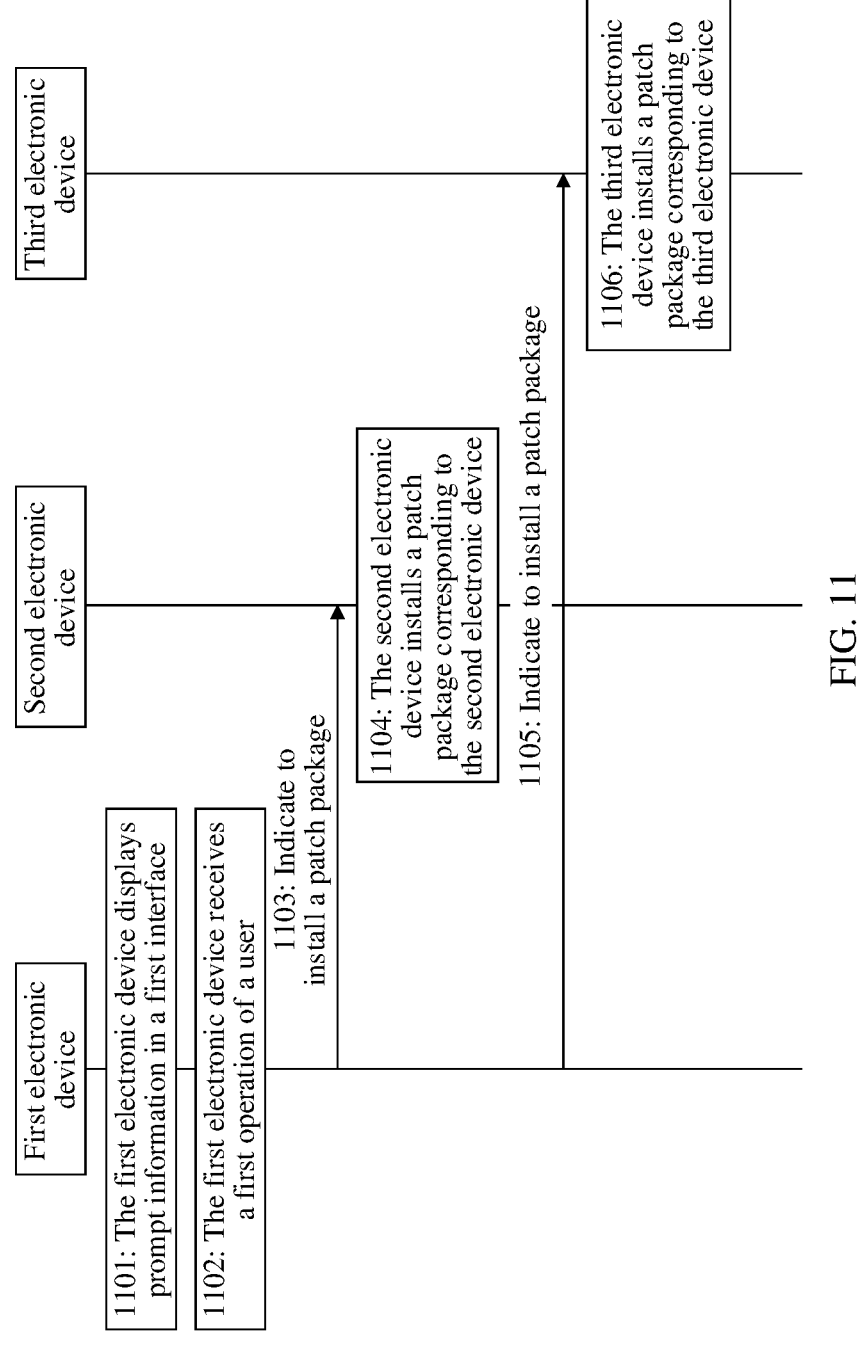
FIG. 11 is a schematic diagram of signal interaction for installing a patch package according to an embodiment of this application.

As shown in FIG. 11, an embodiment of this application provides a patch package installation method, applied to a system that includes a first electronic device, a second electronic device, and a third electronic device, and including the following steps:

1101: The first electronic device displays prompt information in a first interface, where the prompt information is used to prompt that patch packages for the second electronic device and the third electronic device are detected.

Before step 1101, the method may further include the following step: The first electronic device determines a fourth electronic device based on a device type and/or a load value, where the fourth electronic device is configured to search for the patch packages for the second electronic device and the third electronic device; and the fourth electronic device is of a first type and/or a load value of the fourth electronic device is less than a first preset threshold. Alternatively, the first electronic device searches for the patch packages for the second electronic device and the third electronic device. That is, the first electronic device or the fourth electronic device may be used as a package search device. Then, the fourth electronic device or the first electronic device sends a first message to a server (for example, a server 201), where the first message includes an identifier of the second electronic device and an identifier of the third electronic device; or the first message includes a first identifier, the first identifier is used to indicate a plurality of electronic devices, and the plurality of electronic devices include the second electronic device and the third electronic device.

The first identifier is generated based on product serial numbers of the plurality of electronic devices. Alternatively, the first identifier is determined based on a same user account to which both the second electronic device and the third electronic device log in.

Optionally, the first message further includes software version information of the second electronic device and software version information of the third electronic device. Optionally, the first message further includes device model information of the second electronic device and device model information of the third electronic device. Optionally, the first message further includes a type of a patch package to be searched for. The type of the patch package to be searched for is determined based on an operating system and/or a device resource of the electronic device that sends the first message, where the device resource includes at least one of a capacity of a memory or a processing speed of a processor. Types of patch packages include at least one of an application package type, a resource file type, a software framework type, a native framework type, and a kernel type.

The server may determine the plurality of electronic devices corresponding to the first identifier; and the server searches for a patch package for each of the plurality of electronic devices. The server sends a patch package search result to the fourth electronic device or the first electronic device, where the patch package search result is used to indicate whether some or all of the plurality of electronic devices have a patch package. If some or all of the plurality of electronic devices have a patch package, the server sends at least one of version number information of the patch package, uniform resource locator address information, patch size information, or changelog information to the fourth electronic device or the first electronic device.

The server may further send the patch packages for the second electronic device and the third electronic device to the fourth electronic device or the first electronic device. When types of the patch packages for the second electronic device and the third electronic device are the same, the patch packages for the second electronic device and the third electronic device include a first patch package and a second patch package, the first patch package includes all patch programs used to fix software of the second electronic device, and the second patch package includes a patch program that is in all patch programs used to fix software of the third electronic device and that is different from the patch programs of the first patch package.

In a possible design, the server stores a plurality of first identities, and if electronic devices corresponding to all or some of the plurality of first identities have patch packages, the server pushes information about the patch packages to the electronic devices corresponding to all or some of the plurality of first identities.

The fourth electronic device or the first electronic device may perform authentication verification on the patch packages for the second electronic device and the third electronic device, where the authentication verification includes at least one of foolproof verification, security verification, and file verification.

The fourth electronic device or the first electronic device sends the patch packages for the second electronic device and the third electronic device to a fifth electronic device, where the fifth electronic device stores the patch packages for the second electronic device and the third electronic device. Alternatively, the first electronic device stores the patch packages for the second electronic device and the third electronic device.

The fifth electronic device or the first electronic device may broadcast patch package set information, where the patch set information includes cache addresses of the patch packages for the second electronic device and the third electronic device.

1102: The first electronic device receives a first operation of a user, where the first operation is used to install the patch packages for the second electronic device and the third electronic device.

1103: The first electronic device indicates the second electronic device to install the patch package.

The first electronic device may send, based on a setting of the user, a request for installing a patch package to the second electronic device, or the first electronic device may enable permission of automatically installing the patch package after the second electronic device retrieves the patch package. In this way, after obtaining the patch package, the second electronic device may automatically install the patch package.

1104: The second electronic device installs a patch package corresponding to the second electronic device.

The second electronic device may obtain the patch package for the second electronic device from the fifth electronic device or the first electronic device.

In a possible design, the first electronic device may assist the second electronic device in patch package installation. The first electronic device may place the patch package for the second electronic device under a first directory, and the second electronic device mounts the first directory. Alternatively, the second electronic device may provide a second directory, and the first electronic device obtains permission for the second directory through identifier identification, and places the patch package for the second electronic device under the second directory. Alternatively, the first electronic device may mount the patch package for the second electronic device to the second electronic device as a driving peripheral.

1105: The first electronic device indicates the third electronic device to install a patch package.

The first electronic device may send, based on a setting of the user, a request for installing a patch package to the third electronic device, or the first electronic device may enable permission of automatically installing the patch package after the third electronic device retrieves the patch package. In this way, after obtaining the patch package, the third electronic device may automatically install the patch package.

1106: The third electronic device installs a patch package corresponding to the third electronic device.

The third electronic device may obtain the patch package for the third electronic device from the fifth electronic device or the first electronic device.

It should be noted that the first electronic device in the embodiment shown in FIG. 11 may be the mobile phone 102 in the foregoing embodiment, the second electronic device may be a smartwatch 106, a smart headset 108, or the like, the third electronic device may be a router 101, a television 103, a sound box 104, a mobile phone 105, a tablet computer 107, a sound box 109, or the like. For a part that is not described in detail in the embodiment shown in FIG. 11, refer to the foregoing embodiment. Details are not described herein again.

Based on the method provided in this embodiment of this application, installation of the patch packages for the second electronic device and the third electronic device may be controlled and managed on the first electronic device. In response to the first operation of the user, the first electronic device may enable the second electronic device to install the patch package corresponding to the second electronic device, and enable the third electronic device to install the patch package corresponding to the third electronic device, that is, patch packages for a plurality of electronic devices can be installed at the same time. In this way, the user does not need to separately download and install the patch packages, so that a user operation can be simplified, and user experience can be improved.

Some other embodiments of this application provide a first electronic device (for example, the electronic device 200 shown in FIG. 2A). The first electronic device may include a communication module, a memory, and one or more processors. The communication module and the memory are coupled to the processor. The memory is configured to store computer program code, and the computer program code includes computer instructions.

Figure 12:
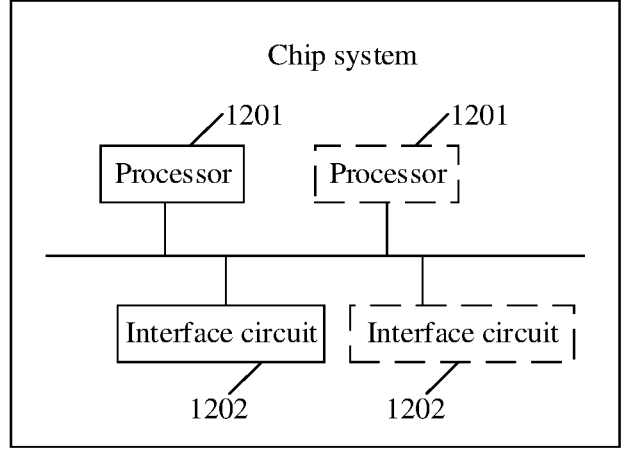
FIG. 12 is a schematic diagram of a chip system according to an embodiment of this application.

Another embodiment of this application provides a chip system. As shown in FIG. 12, the chip system includes at least one processor 1201 and at least one interface circuit 1202. The processor 1201 and the interface circuit 1202 may be interconnected by using a line. For example, the interface circuit 1202 may be configured to receive a signal from another apparatus (for example, a memory of a first electronic device, a memory of a second electronic device, or a memory of a third electronic device). For another example, the interface circuit 1202 may be configured to send a signal to another apparatus (for example, the processor 1201).

For example, the interface circuit 1202 may read instructions stored in a memory in a device, and send the instructions to the processor 1201. When the instructions are executed by the processor 1201, the first electronic device (for example, the electronic device 200 shown in FIG. 2A), the second electronic device, or the third electronic device may be enabled to perform the steps in the foregoing embodiments. Certainly, the chip system may further include another discrete device. This is not specifically limited in this embodiment of this application.

Figure 13:
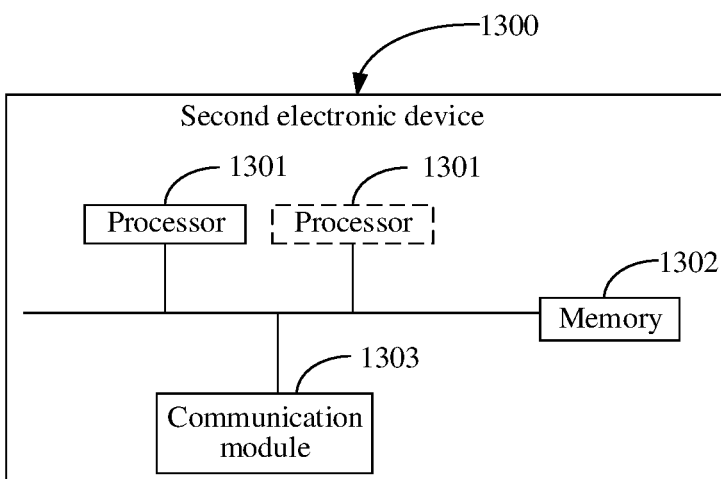
FIG. 13 is a schematic diagram of a second electronic device according to an embodiment of this application.

Another embodiment of this application provides a second electronic device. As shown in FIG. 13, the second electronic device 1300 includes a communication module 1303, a memory 1302, and one or more processors 1301. The communication module 1303 and the memory 1302 are coupled to the processor 1201. The memory 1302 is configured to store computer program code, and the computer program code includes computer instructions. When the computer instructions are executed by the processor 1301, the second electronic device 1300 is enabled to perform the functions or steps performed by the second electronic device in the foregoing method embodiments.

Figure 14:
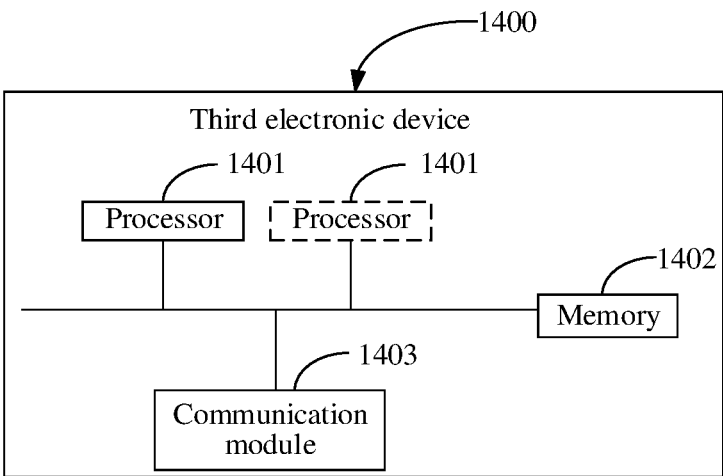
FIG. 14 is a schematic diagram of a third electronic device according to an embodiment of this application.

Another embodiment of this application provides a third electronic device. As shown in FIG. 14, the third electronic device 1400 includes a communication module 1403, a memory 1402, and one or more processors 1401. The communication module 1403 and the memory 1402 are coupled to the processor 1201. The memory 1402 is configured to store computer program code, and the computer program code includes computer instructions. When the computer instructions are executed by the processor 1401, the third electronic device 1400 is enabled to perform the functions or steps performed by the third electronic device in the foregoing method embodiments.

An embodiment of this application further provides a computer-readable storage medium. The computer-readable storage medium includes computer instructions. When the computer instructions are run on a first electronic device (for example, the electronic device 200 shown in FIG. 2A), the electronic device 200 is enabled to perform the functions or steps performed by the first electronic device (for example, the mobile phone) in the foregoing method embodiments. When the computer instructions are run on a second electronic device (for example, the second electronic device 1300 shown in FIG. 13), the second electronic device 1300 is enabled to perform the functions or steps performed by the second electronic device (for example, the smartwatch) in the foregoing method embodiments. When the computer instructions are run on a third electronic device (for example, the third electronic device 1400 shown in FIG. 14), the third electronic device 1400 is enabled to perform the functions or steps performed by the third electronic device (for example, the sound box or the television) in the foregoing method embodiments.

An embodiment of this application further provides a computer program product. When the computer program product runs on a computer, the computer is enabled to perform the functions or steps performed by the first electronic device (for example, the mobile phone), the second electronic device (for example, the smartwatch), or the third electronic device (for example, the sound box or the television) in the foregoing method embodiments.

The foregoing descriptions about implementations allow a person skilled in the art to clearly understand that, for the purpose of convenient and brief description, division of the foregoing function modules is used as an example for illustration. In actual application, the foregoing functions can be allocated to different modules and implemented based on a requirement, that is, an inner structure of an apparatus is divided into different function modules to implement all or some of the functions described above.

In the several embodiments provided in this application, it should be understood that the disclosed apparatuses and methods may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings, direct couplings, or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, that is, may be located in one place, or may be distributed in a plurality of different places. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of steps of the methods in embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, applied to a system that comprises a first electronic device, a second electronic device, and a third electronic device, the method comprising:

displaying, by the first electronic device, prompt information in a first interface, wherein the prompt information prompts that patch packages for the second electronic device and the third electronic device are detected;

receiving, by the first electronic device, a first operation of a user, wherein the first operation selects to install the patch packages for the second electronic device and the third electronic device via a single click by the user on the first interface;

installing, by the second electronic device, a patch package corresponding to the second electronic device according to the first operation; and installing, by the third electronic device, a patch package corresponding to the third electronic device according to the first operation, wherein the patch package corresponding to the second electronic device is installed at the same time as the patch package corresponding to the third electronic device, wherein when types of the patch packages for the second electronic device and the third electronic device are the same, the patch packages for the second electronic device and the third electronic device comprise a first patch package and a second patch package, the first patch package comprises all patch programs used to fix software of the second electronic device, and the second patch package comprises a patch program that is in all patch programs used to fix software of the third electronic device and that is different from the patch programs of the first patch package.

2. The method according to claim 1, further comprising:

determining, by the first electronic device, a fourth electronic device, wherein the fourth electronic device is configured to search for the patch packages for the second electronic device and the third electronic device, and the fourth electronic device is determined based on the fourth electronic device being of a first type or a load value of the fourth electronic device being less than a first preset threshold.

3. The method according to claim 1, further comprising:

searching, by the first electronic device, for the patch packages for the second electronic device and the third electronic device.

4. The method according to claim 1, wherein types of the patch packages comprise at least one of an application package type, a resource file type, a software framework type, a native framework type, or a kernel type.

5. The method according to claim 2, wherein the system further comprises a server, and the method further comprises:

sending, by the fourth electronic device or the first electronic device, a first message to the server, wherein:

the first message comprises an identifier of the second electronic device and an identifier of the third electronic device; or the first message comprises a first identifier, the first identifier indicates a plurality of electronic devices, and the plurality of electronic devices comprises the second electronic device and the third electronic device.

6. The method according to claim 5, wherein the first message further comprises software version information of the second electronic device and software version information of the third electronic device;

the first message further comprises device model information of the second electronic device and device model information of the third electronic device; or the first message further comprises a type of a patch package to be searched for.

7. The method according to claim 6, wherein the type of the patch package to be searched for is determined based on an operating system or a device resource of the electronic device that sends the first message, and wherein the device resource comprises at least one of a capacity of a memory or a processing speed of a processor.

8. The method according to claim 5, further comprising:

determining, by the server, the plurality of electronic devices indicated by the first identifier; and searching, by the server, for a patch package for each electronic device of the plurality of electronic devices.

9. The method according to claim 5, further comprising:

sending, by the server, a patch package search result to the fourth electronic device or the first electronic device, wherein the patch package search result indicates whether some or all of the plurality of electronic devices have a patch package.

10. The method according to claim 9, wherein the some or all of the plurality of electronic devices have a patch package, and the method further comprises:

sending, by the server, at least one of version number information of a corresponding patch package, uniform resource locator address information of the corresponding patch package, patch size information of the corresponding patch package, or changelog information of the corresponding patch package to the fourth electronic device or the first electronic device.

11. The method according to claim 5, wherein the server sends the patch packages for the second electronic device and the third electronic device to the fourth electronic device or the first electronic device.

12. The method according to claim 5, wherein the server stores a plurality of first identities, and the method further comprises:

when electronic devices corresponding to all or some of the plurality of first identities have patch packages, pushing, by the server, information about the patch packages to the electronic devices corresponding to the all or some of the plurality of first identities.

13. The method according to claim 2, further comprising:

performing, by the fourth electronic device or the first electronic device, authentication verification on the patch packages for the second electronic device and the third electronic device, wherein the authentication verification comprises at least one of foolproof verification, security verification, or file verification.

14. The method according to claim 1, further comprising:

assisting, by the first electronic device, the second electronic device in patch package installation.

15. The method according to claim 14, wherein assisting, by the first electronic device, the second electronic device in patch package installation comprises:

placing, by the first electronic device, the patch package for the second electronic device under a first directory, and mounting, by the second electronic device, the first directory.

16. The method according to claim 14, wherein assisting, by the first electronic device, the second electronic device in patch package installation comprises:

providing, by the second electronic device, a second directory, obtaining, by the first electronic device, permission for the second directory through identifier identification, and placing the patch package for the second electronic device under the second directory.

17. The method according to claim 15, wherein assisting, by the first electronic device, the second electronic device in patch package installation comprises:

mounting, by the first electronic device, the patch package for the second electronic device to the second electronic device as a driving peripheral.

18. A system, comprising:

a first electronic device;

a second electronic device; and a third electronic device;

wherein the first electronic device is configured to:

display prompt information in a first interface, wherein the prompt information prompts that patch packages for the second electronic device and the third electronic device are detected; and receive a first operation of a user, wherein the first operation selects to install the patch packages for the second electronic device and the third electronic device via a single click by the user on the first interface;

wherein the second electronic device is configured to:

install a patch package corresponding to the second electronic device according to the first operation; and wherein the third electronic device is configured to:

install a patch package corresponding to the third electronic device according to the first operation, wherein the second electronic device and the third electronic device are configured to respectively install the patch package corresponding to the second electronic device and the patch package corresponding to the third electronic device at the same time, wherein when types of the patch packages for the second electronic device and the third electronic device are the same, the patch packages for the second electronic device and the third electronic device comprise a first patch package and a second patch package, the first patch package comprises all patch programs used to fix software of the second electronic device, and the second patch package comprises a patch program that is in all patch programs used to fix software of the third electronic device and that is different from the patch programs of the first patch package.

19. The system according to claim 18, further comprising:

a fourth electronic device;

wherein the first electronic device is further configured to:

determine the fourth electronic device based on the fourth electronic device being of a first type or a load value of the fourth electronic device being less than a first preset threshold; and wherein the fourth electronic device is configured to:

search for the patch packages for the second electronic device and the third electronic device.

20. A non-transitory computer readable medium with instructions stored thereon, wherein the instructions, when executed by at least one processor, enable the at least one processor to perform:

displaying, by a first electronic device, prompt information in a first interface, wherein the prompt information prompts that patch packages for a second electronic device and a third electronic device are detected;

receiving, by the first electronic device, a first operation of a user, wherein the first operation selects to install the patch packages for the second electronic device and the third electronic device via a single click by the user on the first interface;

causing the second electronic device to install a patch package corresponding to the second electronic device according to the first operation; and causing the third electronic device to install a patch package corresponding to the third electronic device according to the first operation, wherein the patch package corresponding to the second electronic device is installed at the same time as the patch package corresponding to the third electronic device, wherein when types of the patch packages for the second electronic device and the third electronic device are the same, the patch packages for the second electronic device and the third electronic device comprise a first patch package and a second patch package, the first patch package comprises all patch programs used to fix software of the second electronic device, and the second patch package comprises a patch program that is in all patch programs used to fix software of the third electronic device and that is different from the patch programs of the first patch package.

* * * * *